(12) United States Patent
Shibata et al.

(10) Patent No.: US 7,790,324 B2
(45) Date of Patent: Sep. 7, 2010

(54) SEPARATOR PLATE AND FUEL CELL

(75) Inventors: Soichi Shibata, Osaka (JP); Hiroki Kusakabe, Osaka (JP); Eiichi Yasumoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/278,128

(22) PCT Filed: Jan. 30, 2007

(86) PCT No.: PCT/JP2007/051441
§ 371 (c)(1),
(2), (4) Date: Aug. 1, 2008

(87) PCT Pub. No.: WO2007/088832
PCT Pub. Date: Aug. 9, 2007

(65) Prior Publication Data
US 2009/0029228 A1 Jan. 29, 2009

(30) Foreign Application Priority Data
Feb. 2, 2006 (JP) .............................. 2006-025807

(51) Int. Cl.
*H01M 2/14* (2006.01)
*H01M 8/12* (2006.01)
*H01M 4/00* (2006.01)

(52) U.S. Cl. .................. 429/400; 429/403; 429/413; 429/471

(58) Field of Classification Search .............. 429/34, 429/26, 38, 44
See application file for complete search history.

(56) References Cited

U.S. PATENT DOCUMENTS

| 6,248,467 | B1 * | 6/2001 | Wilson et al. | 429/39 |
| 6,413,664 | B1 * | 7/2002 | Wilkinson et al. | 429/34 |
| 2002/0192537 | A1 * | 12/2002 | Ren | 429/44 |
| 2003/0008200 | A1 * | 1/2003 | Ito et al. | 429/44 |

(Continued)

FOREIGN PATENT DOCUMENTS

DE 103 23 644 A1 12/2004

(Continued)

*Primary Examiner*—Jennifer K Michener
*Assistant Examiner*—Eli S Mekhlin
(74) *Attorney, Agent, or Firm*—McDermott Will & Emery LLP

(57) ABSTRACT

The invention relates to a separator plate for use in a fuel cell and to a fuel cell. The separator plate has: a passage groove group including a plurality of gas passage grooves 35 formed so as to extend in serpentine form; and a communicating groove 33 configured to provide fluid communication between adjacent portions of the gas passage grooves. Various separator plates have heretofore been disclosed in public by many documents and the blockage of the gas passage grooves caused by condensed water droplets formed therein is deemed to be properly prevented. However, the inventors think that those separator plates have a critical oversight in the behavior of a gas-liquid two phase fluid including a reaction gas and condensed water. That is, the condensed water is likely to concentrate in the vicinity of the gas passage grooves located in the downstream side of such separator plates and therefore these separator plates are liable to blockage. The invention intends to overcome the above problem by making the communicating groove 33 shallower than the gas passage grooves.

8 Claims, 11 Drawing Sheets

U.S. PATENT DOCUMENTS

2004/0043285 A1 3/2004 Nagoshi et al.
2005/0019647 A1* 1/2005 Blank et al. .................. 429/38
2005/0214626 A1* 9/2005 Ohma ......................... 429/38

FOREIGN PATENT DOCUMENTS

| JP | 2000-100458 | 4/2000 |
|----|-------------|--------|
| JP | 2000-164230 | 6/2000 |
| JP | 2000-251907 | 9/2000 |
| JP | 2002-216805 | 8/2002 |
| JP | 2003-100319 | 4/2003 |
| JP | 2004-146230 | 5/2004 |
| JP | 2004-220950 | 8/2004 |
| JP | 2004-327162 | 11/2004 |
| JP | 2005-093244 | 4/2005 |
| JP | 2005-276519 | 10/2005 |

* cited by examiner

SEPARATOR PLATE AND FUEL CELL

RELATED APPLICATIONS

This application is the U.S. National Phase under 35 U.S.C. §371 of International Application No. PCT/JP2007/051441, filed on Jan. 30, 2007, which in turn claims the benefit of Japanese Application No. 2006-025807, filed on Feb. 2, 2006, the disclosures of which Applications are incorporated by reference herein.

TECHNICAL FIELD

The present invention relates to a separator plate for use in a fuel cell and to a fuel cell.

BACKGROUND ART

First of all, the architecture of a known polymer electrolyte fuel cell (hereinafter referred to as "PEFC" according to need) will be outlined.

PEFC is a cogeneration system that generates electric power and heat at the same time through an electro-chemical reaction between a fuel gas containing hydrogen and an oxidizing gas (e.g., air) containing oxygen, in a fuel cell.

This fuel cell includes a membrane electrode assembly abbreviated to "MEA". In one example of MEA constructions, a catalyst reaction layer (gas diffusion electrode) containing, as a chief component, a carbon powder that carries a metal (e.g., platinum) having catalytic ability is arranged on both surfaces of a polymer electrolyte membrane that selectively transports hydrogen ions. A gas diffusion layer (gas diffusion electrode) having permeability to the fuel gas and oxidizing gas (i.e., reaction gases for power generation) as well as electron conductivity is arranged on the outer side of each catalyst reaction layer.

A gasket (gas sealing member) for preventing gas leak and gas commixture is provided on the periphery of each surface of the MEA. This MEA is held between a pair of electrically-conductive separator plates, that is, an anode separator plate and a cathode separator plate.

Such an MEA, gas sealing members and separator plates are piled so that about 10 to 200 units of MEA each sandwiched between the pair of electrically-conductive separator plates are stacked. Then, these members are held between end plates with a current collecting plate and an insulating plate interposed therebetween and secured by fastening bolts inserted from both ends.

Each separator plate is provided with gas inlet manifold holes and gas outlet manifold holes. Each gas inlet manifold hole allows passage of its associated reaction gas supplied to the fuel cell. Each gas outlet manifold hole allows passage of a gas/liquid mixture fluid including the reaction gas which has been left after the power generation of the fuel cell and water generated through an electro-chemical reaction at the electrode.

Formed on the surface of each separator plate in contact with the MEA are a plurality of gas passage grooves functioning to guide the reaction gas to the gas diffusion electrode of the MEA and send the gas/liquid mixture fluid of generated water and off gas. The gas passage grooves are formed so as to wind, in so-called serpentine form, between their associated gas inlet manifold hole and gas outlet manifold hole.

Although the gas passages for flowing the reaction gas can be formed separately of the separator plate, it is common practice to form a concavo-convex pattern, constituted by a plurality of concave portions (grooves) and a plurality of convex portions (ribs), on the surface of the separator plate as described earlier and to use the concave grooves of this pattern as the gas passages.

The formation of a plurality of such serpentine-shaped gas passage grooves is desirable because it can reduce the resistance of the gas passages laid between the gas inlet manifold hole and the gas outlet manifold hole. Separator plates provided with gas passage grooves of serpentine shape have already been disclosed in many documents (see e.g., FIG. 11 of Patent Document 1 and FIG. 4 of Patent Document 3).

Each of the gas passage grooves provided in each separator plate is a closed space that is defined by the concave portion of the concavo-convex pattern formed on the surface of the separator plate and a surface of the gas diffusion electrode serving as a porous film of the MEA and that has a substantially rectangular sectional shape.

Since it is inevitable that the adjacent serpentine-shaped gas passage grooves are different in flow path length in some regions, a pressure difference appears in these regions, causing "a gas movement (transmission) by way of the gas diffusion electrode" between the adjacent gas passage grooves.

If the degree of such a gas movement between the gas passage grooves exceeds a certain level, uniform feeding of the reaction gas to the MEA may be interrupted by the variation in the gas flow rate between the gas passage grooves. In addition, the gas passage grooves, which lack in the flow volume of gas owing to the variation in the gas flow rate between the gas passage grooves, will be subjected to a significant increase in passage resistance because of a decrease in the ability of discharging the water generated through the electro-chemical reaction of the fuel cell and the vapor flocculated water contained in the reaction gas (these waters are hereinafter referred to as "condensed water"). This escalates the gas movement and, finally, a voltage drop phenomenon may occur owing to the lack of the reaction gas caused by flooding.

It should be noted that the "flooding" as stated hereinabove is a phenomenon that appears in the gas passage grooves of the separator plates when clogged with water droplets and is different from the phenomenon (i.e., flooding within the gas diffusion electrodes) in the gas diffusion electrodes (e.g., the pores serving as gas diffusion paths in the catalyst layers) clogged with water droplets.

As attempts to properly suppress variations in the flow rate and pressure of the reaction gas between a plurality of serpentine-shaped gas passage grooves formed in a separator plate, there have been proposed various techniques such as proper segmentation of the serpentine-shaped gas passage grooves.

One example of such techniques is a separator plate provided with a grid-like projection pattern. This pattern is defined, in grid-like form, in the turn portions of the plurality of gas passage grooves with the intent of uniformizing the flow rate and pressure of the reaction gas between the gas passage grooves (see the prior art disclosed in Patent Document 2).

Another example of the techniques is a separator plate in which the plurality of gas passage grooves are connected by communicating grooves to thereby uniformize the flow rate and pressure of the reaction gas between the plurality of gas passage grooves (see the prior art disclosed in Patent Document 3).

Patent Document 1: JP-A-2000-100458
Patent Document 2: JP-A-2000-164230
Patent Document 3: JP-A-2004-220950

DISCLOSURE OF THE INVENTION

Seemingly, the separator plates of the above prior art techniques are effective in properly preventing the flooding because the variations in the flow rate and pressure of the reaction gas between the plurality of gas passage grooves can be eliminated by the grid-like projection pattern and the communicating grooves, thereby uniformizing the flow rate and pressure of the reaction gas between the gas passage grooves.

However, the inventors think that a critical oversight in the behavior of the droplets of gas-liquid two phase fluid including the reaction gas and condensed water exists in the design of the conventional flood-proof gas passage grooves.

The grid-like projection pattern of Patent Document 2, in which projections are arranged in vertical and lateral directions, is intended to uniformize the pressure and flow rate of the reaction gas flowing in the plurality of gas passage grooves, as pointed out above.

However, the grid-like projection pattern has the following drawback. Since the droplets of condensed water within a fuel cell stack are supposed to easily escape through the clearance among the grid-patterned array of projections owing to their own weight and the inertia force of the whirling droplets, they are likely to concentrate in the vicinity of the gas passage grooves that are located at the downstream side of each turn portion with respect to the flowing direction of the reaction gas. As a result, an excessive amount of water attributable to the condensed water flows into this gas passage groove, interrupting gas diffusion. This may cause flooding that brings about a decrease in the performance of the fuel cell.

Also, the communicating grooves disclosed in Patent Document 3 for connecting the gas passage grooves are formed with a view to uniformize the pressure and flow rate of the reaction gas flowing between the gas passage grooves.

This technique, however, is likely to cause a decrease in the performance of the fuel cell accompanied with flooding, on the ground that: the droplets of condensed water within the fuel cell stack are supposed to easily pass through the communicating grooves owing to their own weight and therefore are likely to concentrate in the vicinity of the downstream gas passage grooves, so that an excessive amount of water attributable to the condensed water flows into these gas passage grooves, interrupting the gas diffusion.

The invention has been made taking account of the background described earlier and a primary object of the invention is therefore to provide a separator plate for use in a fuel cell and a fuel cell which are capable of properly and satisfactorily suppressing the flooding caused by an excessive amount of water within the gas passage grooves.

MEANS OF SOLVING THE PROBLEMS

The inventors have analyzed, by use of a fluid analysis simulation technique, the behavior of the droplets of condensed water in separator plates constructed according to the gas passage groove designs disclosed in the prior art techniques. Herein, the separator plate disclosed in Patent Document 2 is modeled. The details of the analysis simulation will be described below.

<Analysis Simulator>

This fluid simulation was run, using the thermo-fluid analysis general-purpose software "FLUENT" (registered trademark) version 6.2.16 produced by Fluent Inc. U.S. The "FLUENT" (registered trademark) uses a discretization technique called "the finite volume method". Specifically, an analysis target region is divided into minute spaces composed of specified elements (meshes) and a general equation governing the flow of a fluid is solved based on the balance of the fluid given and received between these minute elements. A repetitive arithmetic operation is performed by a computer until the results of the equation converge.

<Analysis Model>

An analysis model was formed on the computer based on the gas passage groove configuration (grid-like projection pattern) illustrated in FIG. 3 of Patent Document 2. Taking account of the facts that it is impossible to know the detailed design spec. of the gas passage grooves illustrated in FIG. 3 of Patent Document 2 from the specification and that the analysis is focused on a qualitative analysis of the behavior of condensed water droplets in the grid-like projection pattern, alterations were made to the configuration (e.g., the number of gas passage grooves and the shape and number of grid-like projection patterns) of the analysis model for the sake of simplicity of model preparation on the condition that the proper qualitative tendency of the behavior of the condensed water droplets can be guaranteed in the analysis simulation. Note that a diagrammatic illustration of the analysis model divided into meshes is omitted herein.

Basically, various data collected in rated operation of fuel cells are used as analysis conditions (boundary conditions etc.) for the above analysis model. For instance, a gas-liquid two phase fluid (flow velocity: 2.34 m/s) containing the condensed water and a reaction gas at a ratio of 1:1 is input as an inflow condition; a surface tension of $7.3 \times 10^{-2}$ N/m as a water solid state property; and a contact angle of e.g., 0.1° as solid state and surface property data of the condensed water and the separator plate. As outflow conditions for the fluid, a pressure of e.g., 927.33 Pa and a pressure loss coefficient of e.g., $4.546 \times 10^9 / m^2$ (Note that a downstream passage groove is made longer than an upstream passage groove by 40 mm that corresponds to the possible increase in the resistance of the downstream passage groove) are employed. Further, the wall faces are considered to be nonslip with respect to the flow velocity of the gas-liquid two phase fluid.

<Analysis Result>

FIG. 8 diagrammatically shows the analysis result together with the analysis model that is displayed on the computer display.

Specifically, FIG. 8 illustrates the distribution of the condensed water (represented as black) and the reaction gas (represented as white) when the flow of gas-liquid two phase fluid has reached its steady state in the analyst model prepared in conformity to the gas passage design shown in FIG. 3 of Patent Document 2.

This analysis result visualizes a scene in which a generous amount of condensed water flows into a part (e.g., the lowermost one) of the downstream gas passage grooves, while turning in the circumferential direction of a turn portion with an inertia force so that the lowermost gas passage groove is about to be clogged with the condensed water. Accordingly, the flooding phenomenon is reproduced by the analysis result, in which the condensed water reaches the lowermost gas passage groove after passing between the grid-like projections and then causes an overflow of the lowermost gas passage groove. The relevancy of such an analyst result has been proved by the voltage drop phenomenon of the fuel cell observed in a protocol test described later.

The invention has been made based on the knowledge acquired from the above-described analysis result, and according to a first aspect of the invention, there is provided a separator plate comprising:

a passage groove group including a plurality of gas passage grooves for flowing a reaction gas, which gas passage grooves are arranged in parallel on a main surface of the separator plate and extend in serpentine form when viewed as a whole; and a communicating groove configured to provide fluid communication between adjacent portions of the gas passage grooves, wherein the communicating groove is formed more shallowly than the gas passage grooves.

Thanks to the communicating groove shallower than the gas passage grooves, not only can the reaction gas pass through the adjacent gas passage grooves by way of the communicating groove, but also the traveling of the condensed water droplets between the adjacent gas passage grooves can be inhibited. As a result, possible variations in the pressure and flow rate of the reaction gas flowing between the gas passage grooves can be avoided and the flooding due to the concentration of the condensed water in the gas passage grooves can be adequately and sufficiently suppressed.

The gas passage groove located at one widthwise end of the passage groove group through the gas passage groove located at the other widthwise end may be communicated with each other in succession by the communicating groove.

Herein, the communicating groove may be formed so as to provide fluid communication between the portions of the gas passage grooves where the pressure of the reaction gas varies if the reaction gas is allowed to flow in the passage groove group on the presumption that the gas passage grooves are communicated with one another by the communicating groove.

This encourages the reaction gas to flow in the communicating groove during operation of the fuel cell stack so that the condensed water droplets existing in the communicating groove can be quickly expelled toward the gas passage grooves by the stream of the reaction gas to thereby restrain dwelling of the droplets within the communicating groove.

In addition, the surface energy of wall faces that define the communicating groove may be smaller than the surface energy of wall faces that define the gas passage grooves and may be, for example, 70 µN/mm or less.

By applying water repellent finishing to the communicating groove wall faces, the condensed water droplets generated in the communicating groove can be kept in a droplet-form state even when they glow, coming into contact with the communicating groove wall faces, and such condensed water droplets can be easily expelled by the reaction gas flowing in the communicating groove. By virtue of this effect in addition to the droplet-dwelling suppressive effect described above, the blockage of the communicating groove due to the growth of the condensed water droplets can be more effectively suppressed.

In addition, a plurality of the aforesaid communicating grooves may be provided and a groove pattern constituted by the gas passage grooves and the communicating grooves may have a grid-like configuration when viewed thicknesswise of the separator plate.

By making the groove pattern constituted by the communicating grooves and the gas passage grooves have a grid-like configuration, the reaction gas flowing to the gas passage grooves by way of the communicating grooves crosses the stream of the reaction gas in the gas passage grooves so that mixing of the reaction gas between the gas passage grooves can be speeded up.

Further, the separator plate may include a gas inlet manifold hole connected to the plurality of gas passage grooves so as to guide the reaction gas into each of the gas passage grooves independently; and a gas outlet manifold hole connected to the plurality of gas passage grooves so as to discharge the reaction gas from each of gas passage grooves independently, and the number of the gas passage grooves connected to the gas outlet manifold hole may be less than the number of gas passage grooves connected to the gas inlet manifold hole.

The number of gas passage grooves is determined, taking account of the consumption of the reaction gas flowing in the gas passage grooves for the power generation, such that the reaction gas flows in the respective zones of the gas passage grooves at the same flow rate appropriate for the ejection of the condensed water droplets.

Therefore, uniform feeding of the reaction gas into the surfaces of the gas diffusion electrodes is enabled and the ability of the reaction gas to expel the condensed water separated from the reaction gas can be ensured at the downstream side (e.g., the vicinity of the gas outlet manifold hole) where the flow volume of the reaction gas is small and therefore the condensed water tends to be easily trapped.

According to a second aspect of the invention, there is provided a fuel cell comprising:

an anode separator plate;

a cathode separator plate; and a membrane electrode assembly disposed between the anode separator plate and the cathode separator plate, wherein the above-described separator plate is incorporated as the anode separator plate and the cathode separator plate, and wherein the reaction gas supplied to the anode separator plate is a reducing gas whereas the reaction gas supplied to the cathode separator plate is an oxidizing gas.

These objects as well as other objects, features and advantages of the invention will become apparent to those skilled in the art from the following detailed description of preferred embodiments with reference to the accompanying drawings.

EFFECTS OF THE INVENTION

The invention provides a separator plate for use in a fuel cell and a fuel cell, which are capable of adequately and sufficiently suppressing flooding caused by excessive amounts of water within the gas groove passages.

EXPLANATION OF REFERENCE NUMERALS

Figure 1:
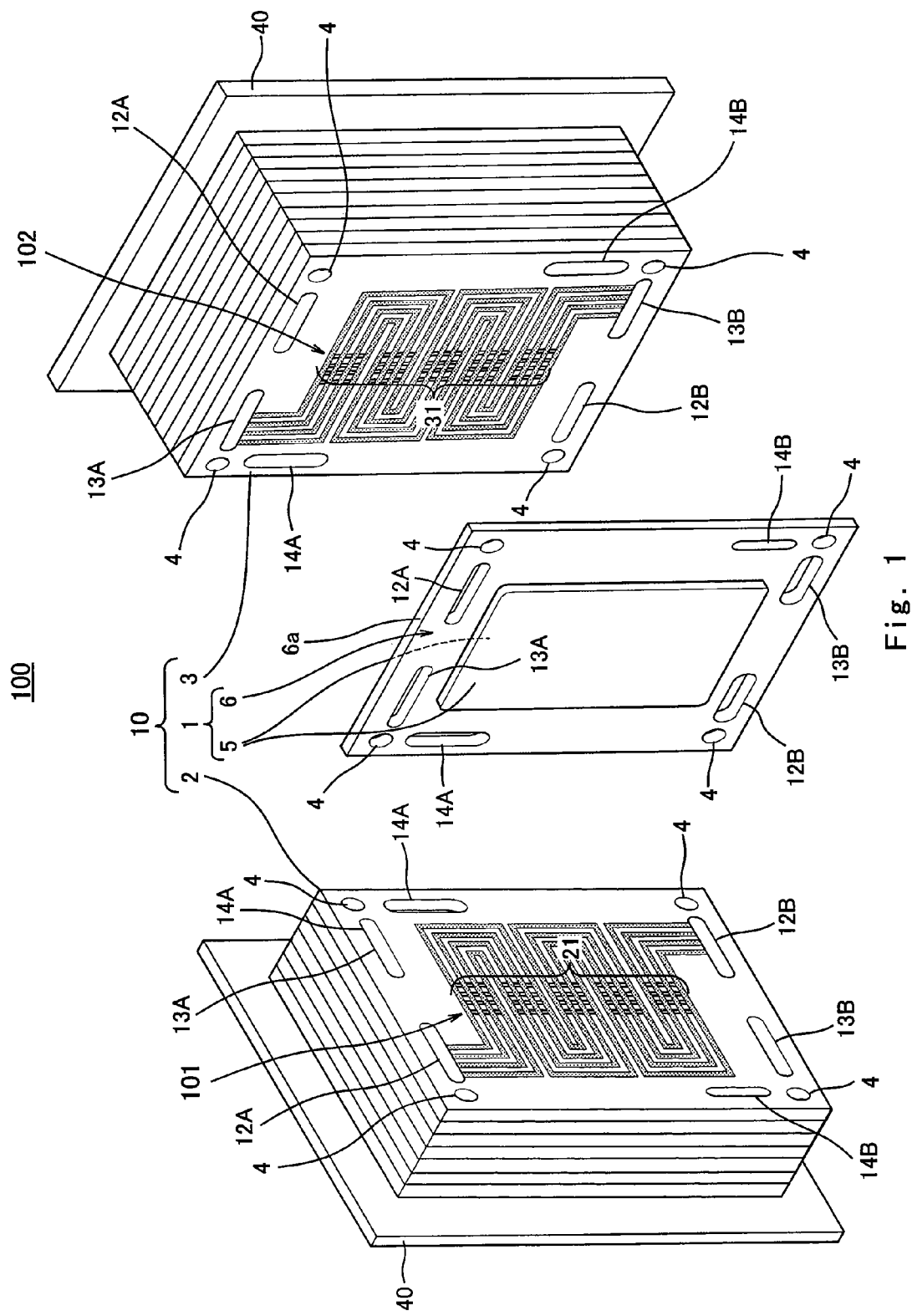
FIG. 1 is a perspective view that diagrammatically shows the configuration of a fuel cell stack in exploded form according to one embodiment of the invention.

1: MEA
2: anode separator plate
3, 103, 203: cathode separator plate
4: bolt hole
5: gas diffusion electrode
6: polymer electrolyte membrane
6a: peripheral portion
10: fuel cell
12A: fuel gas inlet manifold hole
12B: fuel gas outlet manifold hole
13A: oxidizing gas inlet manifold hole
13B: oxidizing gas outlet manifold hole
14A: water inlet manifold hole
14B: water outlet manifold hole
21: fuel gas passage groove set
31: oxidizing gas passage groove set
31A, 31E, 131A, 131G: L-shaped bent portion
31B-31D, 131B-131F: linear portion
32A-32D, 132A-132F: turn portion
33, 133: communicating groove
35, 135: oxidizing gas passage groove
36: rib
37: top face
38, 138: tapered portion
40: end plate
100: fuel cell stack
101: fuel gas passage region
102, 202, 302: oxidizing gas passage region
201: electrode contact region
D1: width of rib (and oxidizing gas passage groove)
D2: width of rectangular communicating groove
D3: one side of wedge-like communicating groove
H: depth of oxidizing gas passage groove
K: equidistance flow path length
G1, G2, G3, G4: hypothetical line
L1, L2: depth of communicating groove
M: diagonal dotted line
P: intersection point
S: pitch
W1: communicating groove wall face
W2: passage groove wall face

BEST MODE FOR CARRYING OUT THE INVENTION

Referring now to the accompanying drawings, the best mode for carrying out the invention will be hereinafter described.

FIG. 1 is a perspective view that diagrammatically shows the configuration of a fuel cell stack in exploded form according to one embodiment of the invention. As shown in FIG. 1, a fuel cell stack 100 is configured to stack a plurality of rectangular, plate-like fuel cells 10.

A power collector plate (not shown) and an insulating plate (not shown) are attached to each end of the fuel cell stack 100 together with an end plate 40. The fuel cells 10 are securely held together by the ends plates 40 with the aid of clamp bolts (not shown) and nuts (not shown), the clamp bolts passing through bolt holes 4 defined in the four corners of each fuel cell 10. Herein, sixty fuel cells 10, for example, are stacked.

The MEA1 of each fuel cell 10 includes a polymer electrolyte membrane 6 and a pair of rectangular gas diffusion electrodes 5 (a catalyst reaction layer and a gas diffusion layer). The gas diffusion electrodes are placed at the central surfaces, respectively, of the polymer electrolyte membrane 6. The fuel cell 10 has a pair of electrically conductive separator plates 2, 3 containing carbon as a chief component. An annular-rectangle-shaped gasket (not shown) is provided on a peripheral portion 6a of the MEA 1. This gasket and the gas diffusion electrodes 5 of the MEA 1 are sandwiched between the pair of electrically conductive separator plates (more specifically, an anode separator plate 2 and a cathode separator plate 3). Note that the construction of the MEA 1 has been heretofore known and therefore a detailed description thereof is omitted herein.

Provided at the surface (the front face, i.e., the main surface in contact with one of the gas diffusion electrodes 5) of the anode separator plate 2 is a fuel gas passage region 101 in which a fuel gas flows. The fuel gas includes the reducing gas of the reaction gases which is supplied to the anode.

The fuel gas passage region 101 includes a fuel gas passage groove set 21 that serves as a passage groove group comprised of a plurality of strip-shaped fuel gas passage grooves. These fuel gas passage grooves are configured to evenly distribute and flow the fuel gas at a constant flow velocity.

Provided at the surface (the front face, i.e., the main surface in contact with the other gas diffusion electrode 5) of the cathode separator plate 3 is an oxidizing gas passage region 102 in which an oxidizing gas flows. The oxidizing gas includes the oxidizing gas of the reaction gases which is supplied to the cathode.

The fuel gas passage region 102 includes an oxidizing gas passage groove set 31 that serves as a passage groove group comprised of a plurality of strip-shaped oxidizing gas passage grooves. These oxidizing gas passage grooves are configured to evenly distribute and flow the oxidizing gas at a constant flow velocity.

These separator plates 2, 3 and the peripheral portion 6a of the MEA 1 are each provided with a fuel gas inlet manifold hole 12A for guiding the fuel gas and a fuel gas outlet manifold hole 12B for discharging the fuel gas; an oxidizing gas inlet manifold hole 13A for guiding the oxidizing gas and an oxidizing gas outlet manifold hole 13B for discharging the oxidizing gas; and a cooling water inlet manifold hole 14A for guiding cooling water and a cooling water outlet manifold hole 14B for discharging the cooling water. These manifold holes pass through the separator plates 2, 3 and the peripheral portion 6a of the MEA 1.

When the fuel cells 10 are stacked, the holes 12A, the holes 12B, the holes 13A, the holes 13B, the holes 14A and the holes 14B are interconnected respectively such that elliptic-cylinder-like fuel gas inlet and outlet manifolds, elliptic-cylinder-like oxidizing gas inlet and outlet manifolds and elliptic-cylinder-like cooling water inlet and outlet manifolds are formed, these manifolds extending in the stacking direction (bolt clamping direction) of the fuel cell stack 100.

The plurality of fuel gas passage grooves in the fuel gas passage region 101 are respectively independently connected to the fuel gas inlet manifold hole 12A and the fuel gas outlet manifold hole 12B so as to connect the manifold holes 12A, 12B. The fuel gas passage grooves are formed in parallel on the surface of the anode separator plate 2 and wind in serpentine form when viewed as a whole.

Thereby, part of the fuel gas flowing in the fuel gas inlet manifold is guided to the fuel gas passage region 101 of each anode separator plate 2 through the fuel gas inlet manifold hole 12A. The fuel gas thus guided is consumed in the MEA 1 while flowing in the fuel gas passage region 101. The fuel gas, which has not been consumed in the MEA 1, flows out from the fuel gas passage region 101 into the fuel gas outlet manifold hole 12B of each anode separator plate 2 and is discharged to the outside of the fuel cell stack 100 after passing through the fuel gas outlet manifold.

The plurality of oxidizing gas passage grooves of the oxidizing gas passage region 102 are respectively independently connected to the oxidizing gas inlet manifold hole 13A and the oxidizing gas outlet manifold hole 13B so as to connect the manifold holes 13A, 13B. The oxidizing gas passage grooves are formed in parallel on the surface of the cathode separator plate 3 and wind in serpentine form when viewed as a whole.

Thereby, part of the oxidizing gas flowing in the oxidizing gas inlet manifold is guided to the oxidizing gas passage region 102 of each cathode separator plate 3 through the oxidizing gas inlet manifold hole 13A. The oxidizing gas thus guided is consumed at the MEA 1 while flowing in the oxidizing gas passage region 102. The oxidizing gas, which has not been consumed in the MEA 1, flows out from the oxidizing gas passage region 102 into the oxidizing gas outlet manifold hole 13B of each cathode separator plate 3 and is discharged to the outside of the fuel cell stack 100 after passing through the oxidizing gas outlet manifold.

The cooling water used for keeping the fuel cells 10 at a proper temperature flows into a plurality of cooling water grooves (not shown) provided on the rear face (the surface opposite to the front face noted earlier) of the cathode separator plate 3 through the cooling water inlet and outlet manifolds. Herein, a detailed explanation of the structure of the flow passage of the cooling water is omitted.

Next, the configuration of the oxidizing gas passage region 102 provided in the cathode separator plate 3 will be described with reference to the drawings.

Although the arrangement for flood prevention according to the embodiment will be described, taking the cathode separator plates 3 for example in which the water generated by the power generation of the fuel cell stack 100 flows in a relatively large amount, the design technique described below is applicable to the anode separator plates 2 of the fuel cell stack 100. The configuration of the anode separator plates 2 can be easily understood from the following description of the cathode separator plates 3 and therefore an explanation thereof is omitted herein.

Figure 2:
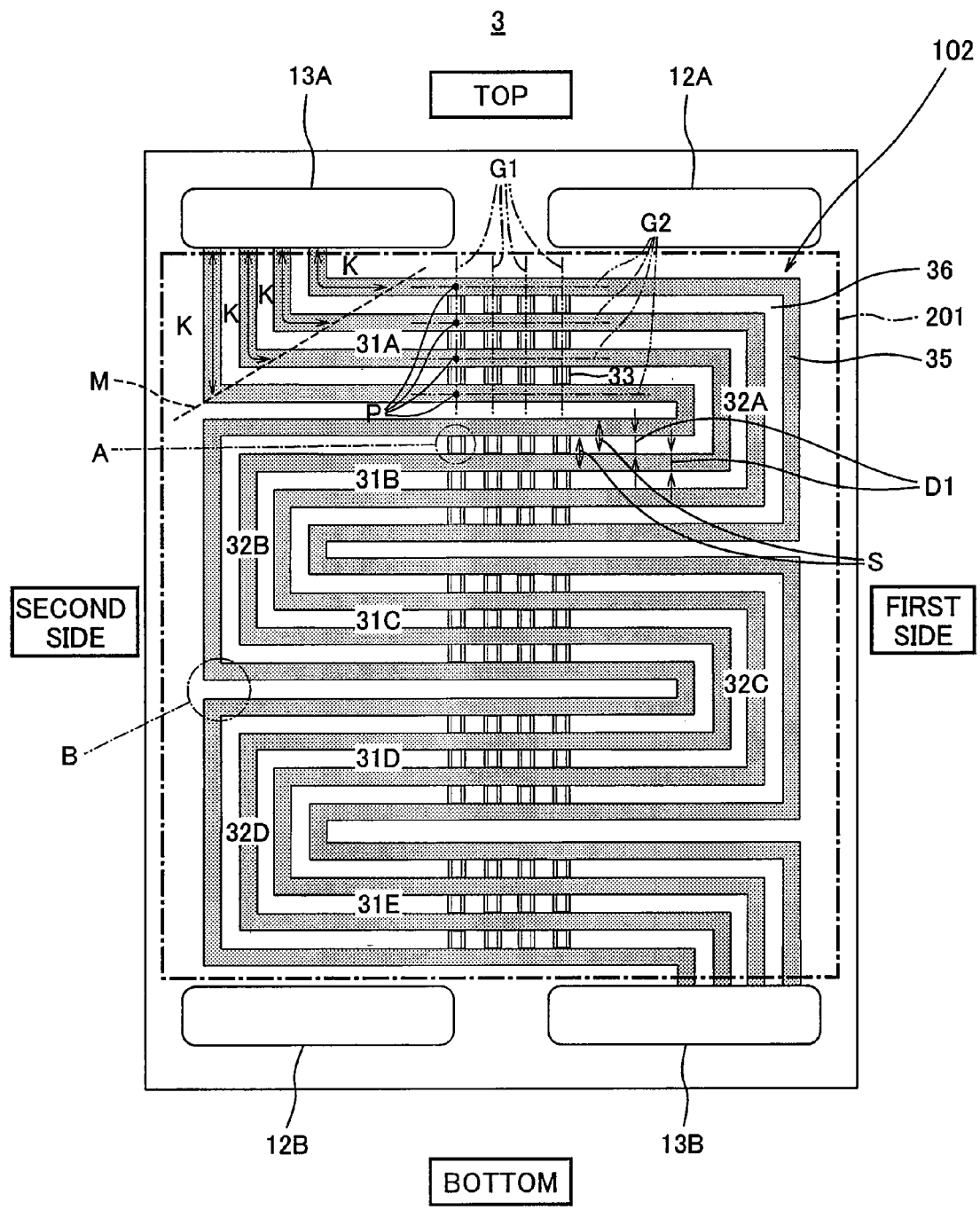
FIG. 2 is a diagram of a cathode separator plate constructed according to the embodiment.
Figure 3:
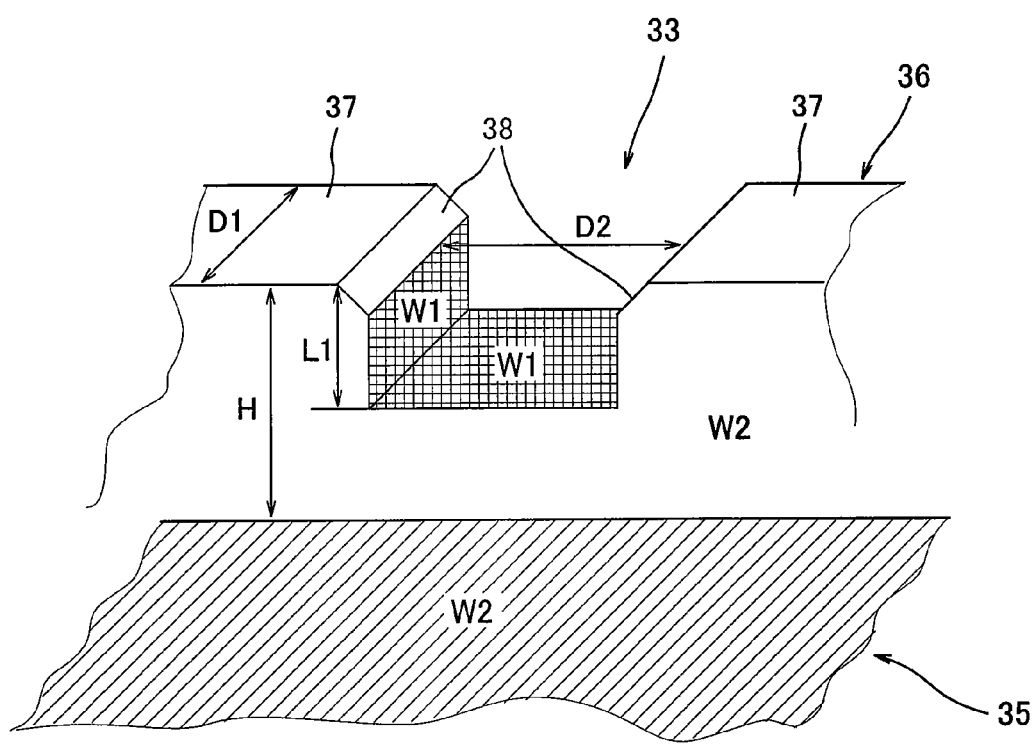
FIG. 3 is an enlarged perspective view that diagrammatically shows a communicating groove formed on ribs and an oxidizing gas passage groove in the region A of FIG. 2.

FIG. 2 shows the surface of a cathode separator plate constructed according to the embodiment. FIG. 3 is an enlarged perspective view that diagrammatically shows a communicating groove formed on ribs and an oxidizing gas passage groove in the region A of FIG. 2.

Figure 5:
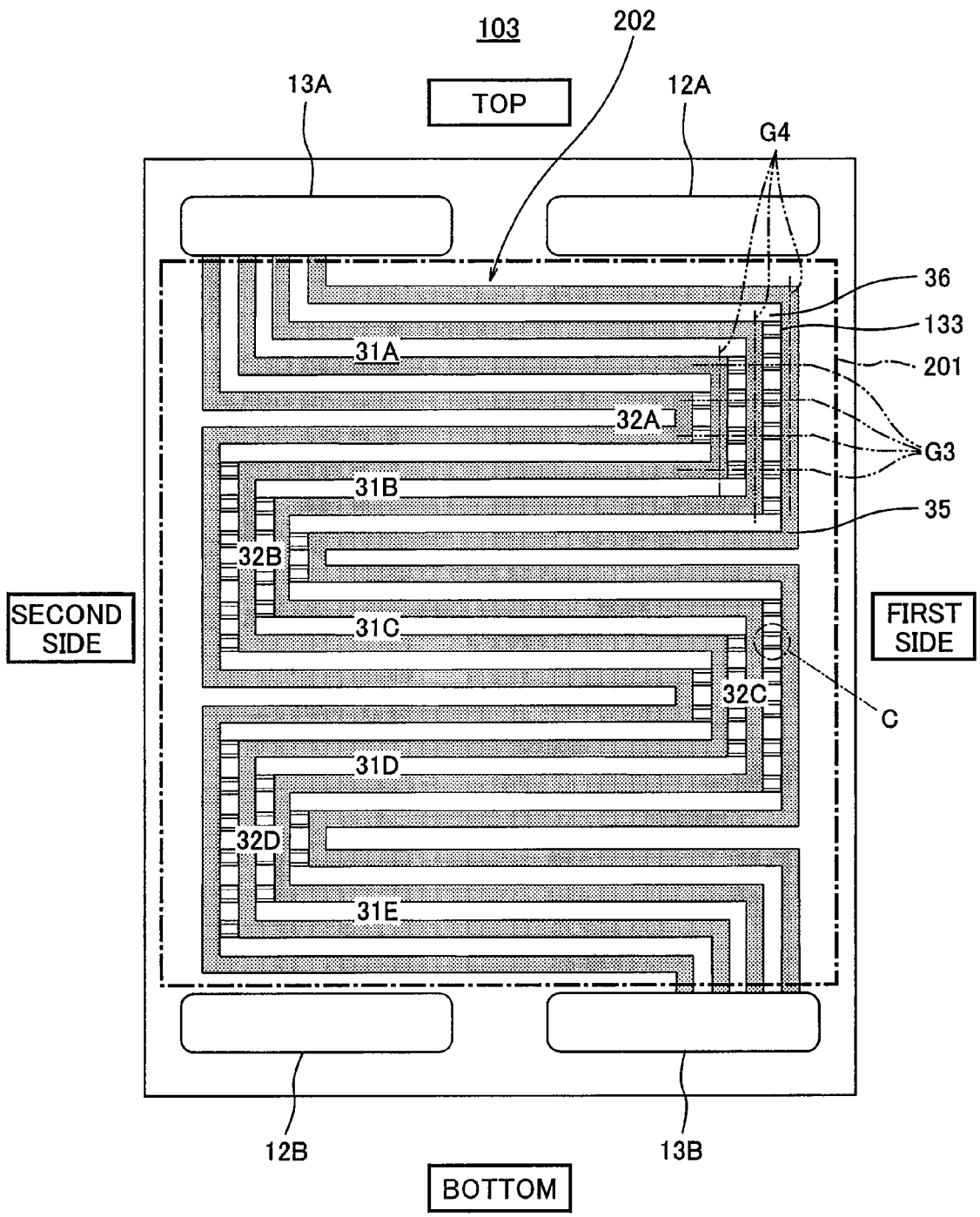
FIG. 5 is a diagram illustrating, as a structural example, a surface of a cathode separator according to Modification 1.
Figure 7:
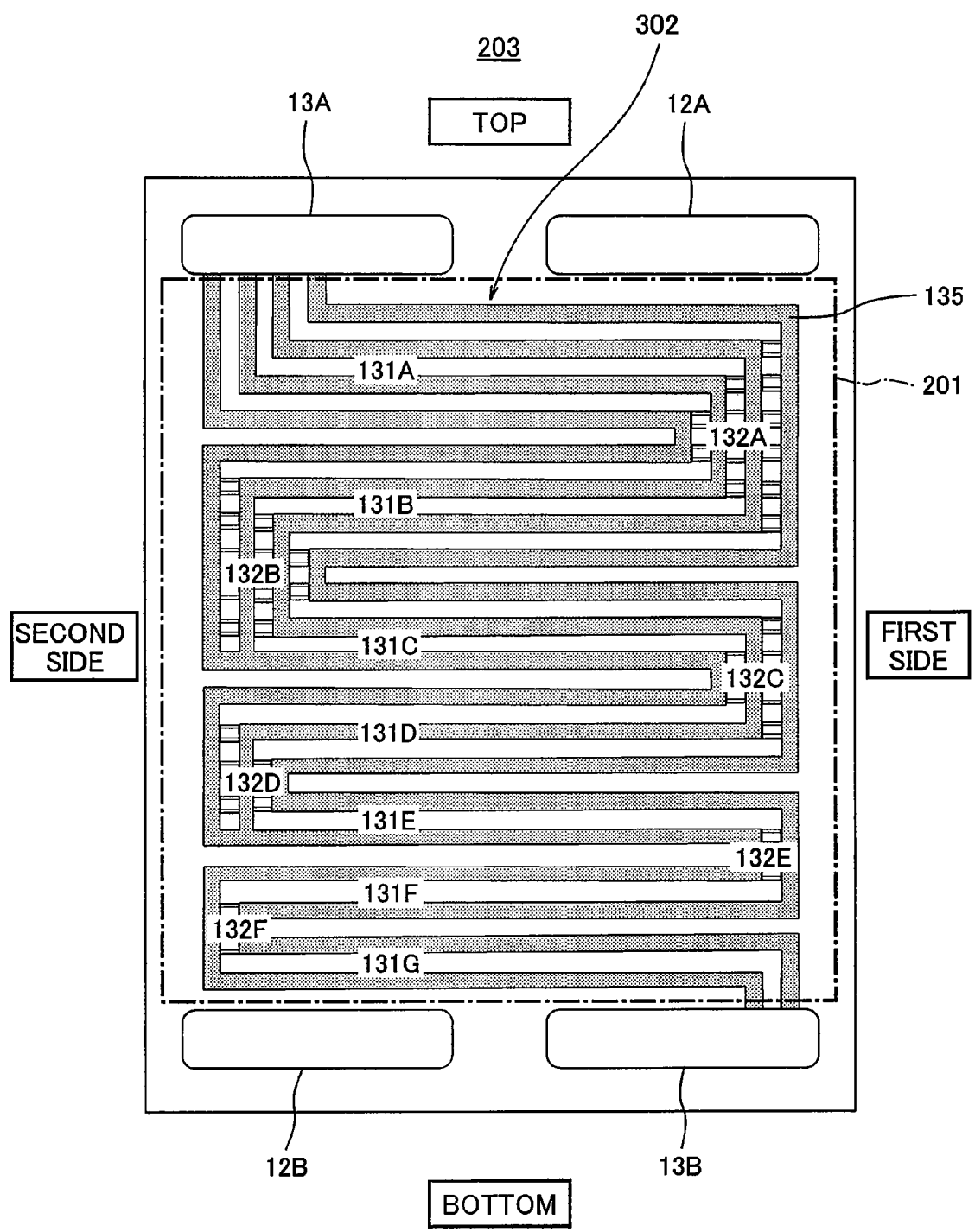
FIG. 7 is a diagram illustrating, as a structural example, a surface of a cathode separator according to Modification 2.

In FIGS. 2, 5, and 7, the terms "top" and "bottom" refer to the upward direction and the downward direction, respectively, in an installation condition of the fuel cell stack 100 into which the cathode separator 3 is incorporated, and in FIGS. 2, 5, and 7, the terms "first side" and "second side" refer to the rightward or leftward direction and the leftward or rightward direction, respectively, in the installation condition of the fuel cell stack 100 into which the cathode separator 3 is incorporated.

In the interest of brevity, elements other than the internal elements of the oxidizing gas passage region 102, the fuel gas inlet manifold hole 12A, the fuel gas outlet manifold hole 12B, the oxidizing gas inlet manifold hole 13A, and the oxidizing gas outlet manifold hole 13B are omitted from FIGS. 2, 5, and 7.

In the oxidizing gas passage region 102 within an electrode contact region 201 of the cathode separator plate 3 which electrode contact region 201 is in contact with its associated gas diffusion electrode 5, four oxidizing gas passage grooves 35 and three ribs (partition walls) 36 which define the oxidizing gas passage grooves 35 are formed in substantially rectangular form when viewed in a direction perpendicular to the flowing direction of the oxidizing gas.

These oxidizing gas passage grooves 35 are formed by grinding the groove formation area of the surface of the cathode separator plate 3 up to a certain depth H (see FIG. 3). The sections, left after grinding the area corresponding to the oxidizing gas passage grooves 35 away from the surface of the cathode separator plate 3, constitute the ribs 36.

Therefore, the top faces 37 of the ribs 36 (see FIG. 3) are flush with the surface of the cathode separator plate 3. In short, the oxidizing gas passage grooves 35 serve as an area where the oxidizing gas flows whereas the surface of the cathode separator plate 3 and the ribs 36 serve as a support area for supporting the gas diffusion electrode 5.

As shown in FIG. 2, the four oxidizing gas passage grooves 35 and the three ribs 36 are both formed with a uniform width D1 and a uniform pitch S in their width direction.

According to the configuration of the cathode separator plate 3, the gas diffusion electrode 5 of MEA 1 is evenly supported by the flat top faces 37 of the ribs 36 that have the uniform width D1 and height H (see FIG. 3) and are arranged at the uniform pitch S. The gas diffusion electrode 5 sinks evenly into the oxidizing gas passage grooves 35 that have the uniform width D1 and depth H (see FIG. 3) and are arranged at the uniform pitch S. This favorably makes it possible to suppress the variations in oxidizing gas pressure losses in the plurality of oxidizing gas passage grooves 35 caused when letting the oxidizing gas flow in the oxidizing gas passage grooves 35. Moreover, the nonuniformity of the diffusion of the oxidizing gas on the surface (the oxidizing gas diffuses in a plane perpendicular to the thickness direction of the gas diffusion electrode 5) of the gas diffusion electrode 5 can be desirably suppressed.

In this embodiment, the four oxidizing gas passage grooves 35 extend in serpentine form between the oxidizing gas inlet manifold hole 13A and the oxidizing gas outlet manifold hole 13B within the oxidizing gas passage region 102, as shown in FIG. 2.

More specifically, in a first L-shaped bent portion 31A of the oxidizing gas passage region 102, the four oxidizing gas passage grooves 35 are respectively independently connected to the oxidizing gas inlet manifold hole 13A located at the upper side and extend downward from the oxidizing gas inlet manifold hole 13A to a point at which they bend at substantially 90 degrees, taking the form of L. Then, the oxidizing gas passage grooves 35 extend from the second side toward the first side. It should be noted that if the position of the oxidizing gas inlet manifold hole 13A is shifted about 90 degrees, the first L-shaped bent portion 31A can be made linear.

In a first turn portion 32A of the oxidizing gas passage region 102, the four oxidizing gas passage grooves 35 continue from the grooves 35 in the first L-shaped bent portion 31A and then make an approximately 180° turn, bending at a right angle twice so that they are formed into a substantially U-shape.

In a first linear portion 31B of the oxidizing gas passage region 102, the four oxidizing gas passage grooves 35 continue from the grooves 35 in the first turn portion 32A located on the first side and linearly extend toward the second side.

In a second turn portion 32B of the oxidizing gas passage region 102, the four oxidizing gas passage grooves 35 continue from the grooves 35 in the first linear portion 31B and then make an approximately 180° turn, bending at a right angle twice so that they are formed into a substantially U-shape.

In a second linear portion 31C of the oxidizing gas passage region 102, the four oxidizing gas passage grooves 35 continue from the grooves 35 in the second turn portion 32B located on the second side and linearly extend toward the first side.

In a third turn portion 32C of the oxidizing gas passage region 102, the four oxidizing gas passage grooves 35 continue from the grooves 35 in the second linear portion 31C and then make a 180° turn, bending at a substantially right angle twice so that they are formed into a substantially U-shape.

In a third linear portion 31D of the oxidizing gas passage region 102, the four oxidizing gas passage grooves 35 continue from the grooves 35 in the third turn portion 32C located on the first side and linearly extend toward the second side.

In a fourth turn portion 32D of the oxidizing gas passage region 102, the four oxidizing gas passage grooves 35 continue from the grooves 35 in the third linear portion 31D and then make an approximately 180° turn, bending at a right angle twice so that they are formed into a substantially U-shape.

In a second L-shaped bent portion 31E of the oxidizing gas passage region 102, the four oxidizing gas passage grooves 35 continue from the grooves 35 in the fourth turn portion 32D located on the first side, extending to the second side. Then, they bend at approximately 90 degrees to extend downward, taking the form of L and are respectively independently connected to the oxidizing gas outlet manifold hole 13B. It should be noted that if the position of the oxidizing gas outlet manifold hole 13B is shifted about 90 degrees, the second L-shaped bent portion 31E can be made linear.

Reference is made to FIGS. 2 and 3 in order to concretely describe a configuration of communicating grooves 33 that characterize the invention.

First, the arrangement of the communicating grooves 33 will be explained.

As shown in FIGS. 2, 3, a plurality of communicating grooves 33 are arranged in the substantially central positions of the long linear parts of the first and second L-shaped portions 31A, 32E and the first to third linear portions 31B, 31C, 31D. The communicating grooves 33 interconnect the adjacent portions of the oxidizing gas passage grooves 35 and are formed by partially cutting the ribs 36 of the cathode separator plate 3 away widthwise of the oxidizing gas passage grooves 35 (i.e., in a width direction of the oxidizing gas passage groove group).

Herein, the oxidizing gas passage groove 35 located on one end of the oxidizing gas passage groove group with respect to a width direction thereof through the oxidizing gas passage groove 35 located on the other end are communicated with each other in succession by the plurality of communicating grooves 33.

According to this embodiment, in the first and second L-shaped bent portions 31A, 31E and the first to third linear portions 31B, 31C, 31D, four communicating grooves 33 are formed at specified intervals in each of the three ribs 36, whereby a set of communicating grooves 33 (i.e., twelve communicating grooves 33 in total) is disposed in a region that is substantially rectangular when viewed in a thickness direction of the cathode separator plate 3 (hereinafter this view is referred to as "plan view").

It should be noted that the meaning of "the adjacent portions of the passage grooves" expressed in this specification is not necessarily limited to the adjacent oxidizing gas passage grooves each of which is independently connected to the oxidizing gas inlet manifold hole 13A and the oxidizing gas outlet manifold hole 13B. The meaning of "the adjacent portions of the passage grooves" includes, for instance, an upstream portion and downstream portion of the same oxidizing gas passage groove 35 like the region B shown in FIG. 2, such upstream and downstream portions becoming adjacent to each other as the result of winding of the oxidizing gas passage grooves 35 in serpentine form. In this case, the bar-like partition wall partitioning the upstream portion and downstream portion of the oxidizing gas passage groove 35 is one of the ribs.

In FIG. 2, four hypothetical lines G1 are drawn, each representing the axis common to three communicating grooves 33 aligned in the width direction of the oxidizing gas passage groove 35 (i.e., every three communicating grooves 33 aligned in the width direction of the oxidizing gas passage groove 35 has a common elongation axis represented by G1). The groove pattern of arrangement of the communicating grooves 33 and the oxidizing gas passage grooves 35 is a grid-like pattern in plan view. The communicating grooves 33 and the oxidizing gas passage grooves 35 are extending along a grid-like mesh made by the four hypothetical lines G1 and hypothetical lines G2 along the oxidizing gas passage grooves 35. By arranging the communicating grooves 33 and the oxidizing gas passage grooves 35 in such a grid-like pattern (that is an orthogonal grid pattern in this example), the streams of oxidizing gas flowing into the oxidizing gas passage grooves 35 by way of the communicating grooves 33 cross the streams of oxidizing gas in the oxidizing gas passage grooves 35 (at right angles in this embodiment), so that mixing of the oxidizing gas between the oxidizing gas passage grooves 35 can be speeded up.

Next, an example of the configuration of the communicating grooves 33 will be described.

Each of the communicating grooves 33 is a substantially rectangular groove formed by cutting a substantially rectangular parallelepiped portion (depth=L1, width=D2) away from the top face 37 of the rib 36, as illustrated in FIG. 3. The edges of each communicating groove 33, in contact with the associated gas diffusion electrode 5, are chamfered, forming tapered portions 38 as shown in FIG. 3. Thereby, mechanical damage (e.g., breakage) to the gas diffusion electrode 5 caused by the contact between the edges of the communicating grooves 33 and the gas diffusion electrode 5 can be avoided.

The communicating grooves 33 having the depth L1 are designed to be formed more shallowly than the oxidizing gas passage grooves 35 having the depth H. By forming the communicating grooves 33 more shallowly than the oxidizing gas passage grooves 35, the droplets E of condensed water flowing together with the oxidizing gas within the oxidizing gas passage grooves 35 can be made unlikely to pass through the communicating grooves 33, as seen from FIG. 4 that shows the streams of the gas-liquid two phase fluid including the oxidizing gas and water droplets. If the diameter of the substantially spherical droplets E of condensed water is equal to or more than the depth L1 of the communicating grooves 33, such droplets will go straight ahead within the oxidizing gas passage grooves 35 without passing through the communicating grooves 33, as indicated by solid arrow of FIG. 4.

Figure 4:
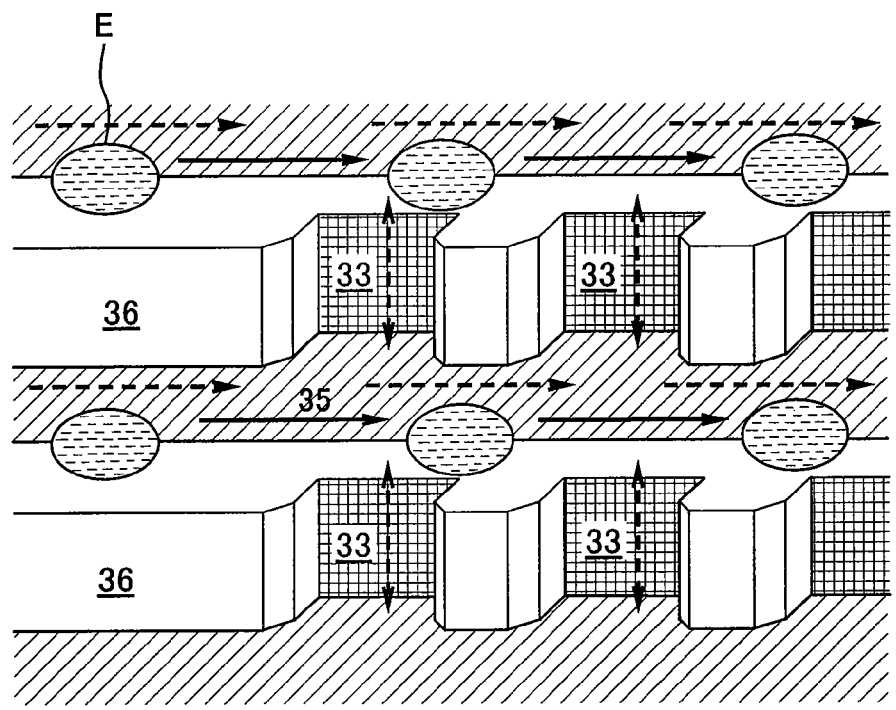
FIG. 4 is an explanatory diagram illustrating streams of a gas-liquid two phase fluid including an oxidizing gas and water droplets.

Meanwhile, the oxidizing gas within the oxidizing gas passage grooves 35 does not interrupt the stream of gas within the communicating grooves 33 as indicated by dotted arrow of FIG. 4, regardless of the difference between the depth L1 of the communicating grooves 33 and the depth H of the oxidizing gas passage grooves 35. As a result, the undesirable concentration of the condensed water in the vicinity of the lower oxidizing gas passage grooves 35 caused by the own weight of the condensed water droplets E can be lessened, while uniformizing the flow rate and pressure of the oxidizing gas between the oxidizing gas passage grooves 35.

The best way is such that the minimum shape (e.g., the diameter of the droplets E on assumption that the droplets E are spherical in shape) of the droplets E of condensed water, the droplets E start to move by the flow of oxidizing gas based on the shape, is first estimated and a value smaller than this estimated value is determined as the concrete value of the depth L1 of the communicating grooves 33 of the cathode separator plate 3. However, the suppressive effect on the traveling of the condensed water can be obtained at least by making the depth L1 of the communicating grooves 33 smaller than the depth H of the oxidizing gas passage grooves 35. In fact, the growth of the condensed water droplets E, the droplets E start to move by the flow of oxidizing gas based on the growth, depends on the operating conditions of the fuel cell stack 100 and the surface condition of the cathode separator plates 3. Therefore, an appropriate value for the depth L1 of the communicating grooves 33 should be set in the determining process of a detailed design specification for the fuel cell stack 100 so as to meet the operating conditions of the fuel cell stack 100 and the surface condition of the cathode separator plates 3.

While the traveling of the condensed water droplets E (that flow together with the oxidizing gas) through the communicating grooves 33 is suppressed by making the depth L1 of the communicating grooves 33 smaller than the depth H of the oxidizing gas passage grooves 35 (i.e., L1<H) in this embodiment, it is theoretically possible to obtain the same effect by narrowing the width D2 of the communicating grooves 33. In short, the condensed water droplets E can be restrained from passing through the communicating grooves 33 by making either of the two directional dimensions (that are the depth L1 and width D2 in this embodiment) orthogonal to the flowing direction of the oxidizing gas in the communicating grooves 33 smaller than the diameter of the condensed water droplets E (provided that the droplets E are spherical), which probably leads to lessening of the undesirable concentration of the condensed water in the vicinity of the lower oxidizing gas passage grooves 35 due to the own weight of the condensed water droplets E.

The inventors however think that when giving a concrete form to the idea of the embodiment through its application to the cathode separator plates 3, an adjustment of the depth L1 of the communicating grooves 33 like the embodiment is more desirable in view of the manufacture of the cathode separator plates 3, because a proper design limit for the communicating grooves 33 can be ensured. The reason for this will be described below.

The cathode separator plates 3, chiefly containing carbon and provided with a fine groove pattern such as the communicating grooves 33, are generally produced by cutting by use of a grinding stone (i.e., the cutting process) or molding by use of dies for separator plates (i.e., the die molding process). In both the cutting process and the die molding process, there is thought to exist a limit that specifies the minimum width of a groove to be processed (i.e., a lower limit for processing width). Experience has shown that such lower limit for processing width is about 0.6 mm in the cutting process and about 0.8 mm in the die molding process. It seems that it is difficult to adjust the width D2 of the communicating grooves 3 to less than 0.6 mm as far as the current lower limit is taken into account. Therefore, if the size (diameter) of the droplets E of condensed water, the droplets E start to move by the flow of oxidizing gas based on the size, becomes less than 0.6 mm in accordance with the operating conditions of the fuel cell stack 100 and the surface condition of the cathode separator plates 3, the cathode separator plates 3 constructed according to "the design intended to reduce the width D2 of the communicating grooves 33" will not satisfactorily exert the suppressive effect on the traveling of the condensed water. In this regard, if a new processing technique that reduces the width D2 to a satisfactory extent (e.g., 0.1 mm) is developed, the narrow-width design for the communicating grooves 33 will be employed as an alternative option in future.

In contrast with this, experience has shown that the depth L1 of the communicating grooves 33 can be adjusted to a sufficiently small value (e.g., 0.1 mm) in both the cutting process and the die molding process. Therefore, no matter what size the droplets E of condensed water, the droplets E start to move by the flow of oxidizing gas based on the size, take in accordance with the operating conditions of the fuel cell stack 100 and the surface condition of the cathode separator plates 3, the cathode separator plates 3 constructed according to "the design intended to reduce the depth L1 of the communicating grooves 33" properly exert the suppressive effect on the traveling of the condensed water.

The present embodiment employs, as the method of producing the cathode separator plates 3, the die molding process that is superior to the cutting process in terms of mass productivity.

Next, an example of the formation of the communicating grooves 33 will be explained, which prevents the communicating grooves 33 from being clogged with the growing condensed water.

The hypothetical lines G1 (see FIG. 2) indicating the elongation axes of the communicating grooves 33 are set such that when a predetermined amount of oxidizing gas is allowed to flow to each of the oxidizing gas passage grooves 35, the pressures of the oxidizing gas generated at adjacent points of the oxidizing gas passage grooves 35 differ from each other.

Specifically, when letting the oxidizing gas flow into the gas passage grooves arbitrarily selected from the four communicating grooves 33, the pressure of the oxidizing gas at the intersection point P between one communicating groove 33 and one of arbitrarily selected adjacent two gas passage grooves 35 differs from the pressure of the oxidizing gas at the intersection point P between the aforesaid communicating groove 33 and the other gas passage groove 35.

In other words, the two intersection points P between adjacent two portions in the oxidizing gas passage grooves 35 which makes these adjacent portions communicate with each other and the communicating groove 33 are positioned such that the pressures of the oxidizing gas at these adjacent portions 35 do not become equal.

Incidentally, the positions at which the pressures of the oxidizing gas within the oxidizing gas passage grooves 35 become equal to each other are the points at which the flow path lengths of the adjacent oxidizing gas passage grooves 35 become equal to each other. Taking the four oxidizing gas passage grooves 35 of the cathode separator plate 3 shown in FIG. 2 for example, the respective positions in the four oxidizing gas passage grooves 35 located equidistance flow path length K (which could be any value within the range of 0<K<the flow path length of the oxidizing gas passage grooves 35) away from the oxidizing gas inlet manifold hole 13A fall under this situation. In FIG. 2, these positions, which serving as one example, are connected by a diagonal dotted line M.

As described above, the cathode separator plate 3 of this embodiment is designed such that the four hypothetical lines G1 that indicate the elongation axes of the communicating grooves 33 are displaced from the diagonal dotted line M so that the cathode separator plate 3 exerts the following effect.

If the communicating grooves are formed so as to pass through such positions (which are located in the oxidizing gas passage grooves, intersecting the diagonal dotted line M) that the oxidizing gas pressures in the adjacent oxidizing gas passage grooves become equal to each other at a start of the operation of the fuel cell stack 100 (i.e., initial stage), no pressure difference appears between both ends of each communicating groove with the result that the oxidizing gas dwells within the communicating grooves. If the operation of the fuel cell stack 100 continues in such a condition, the condensed water droplets separated from the oxidizing gas are likely to dwell within the communicating grooves due to the dwelling of the oxidizing gas and the condensed water droplets dwelling in the communicating grooves come to have liquid films as they grow, causing the possible clogging of the communicating grooves. It can be predicted that once the communicating grooves are blocked up with the condensed water liquid films, unclogging of the communicating grooves becomes difficult. That is, if the state transition of the condensed water within the oxidizing gas passage grooves causes a change in the flow path resistance of each oxidizing gas passage groove, generation of gas differential pressure that creates a stream of oxidizing gas within the communicating grooves 33 clogged with the condensed water liquid films can be somewhat expected, but there is no guarantee that such gas differential pressure overcomes the surface tension of the condensed water liquid films that clog up the communicating grooves 33, thereby relieving the communicating grooves 33 from the blockage.

With the intent of preventing the blockage of the communicating grooves due to the growth of the condensed water, the hypothetical lines G1 that represent the elongation axes of the communicating grooves 33 are shifted from the diagonal dotted line M shown in FIG. 2 like this embodiment, whereby a stream of the oxidizing gas is positively created within the communicating grooves 33 at a start-up of the fuel cell stack 100. Thereby, the condensed water droplets E are promptly expelled from the communicating grooves 33 into the oxidizing gas passage grooves 33 by the stream of the oxidizing gas to thereby suppress the dwelling of the droplets E within the communicating grooves 33.

In view of the synergy effect in combination with the inhibition of the dwelling of the droplets E within the communicating grooves 33, it is beneficial to impart significant water repellency to wall faces W1 (see FIG. 3) that define each communicating groove 33.

That is, it is desirable that the water repellency of the wall faces W1 of the communicating grooves 33 be made higher than that of the wall faces W2 of the oxidizing gas passage grooves 35 (in other words, it is desirable that the surface energy of the communicating groove wall faces W1 be made lower than that of the passage groove wall faces W2), in order to adequately suppress the unfavorable formation of the liquid films of the growing condensed water on the communicating groove wall faces W1, which is attributable to the hydrophilic properties of the communicating groove wall faces W1.

Thanks to the water repellent finishing of the communicating groove wall faces W1, the condensed water droplets E generated in the communicating grooves 33 can be kept in a drop-shaped state even when they grow and come into contact with the communicating groove wall faces W1 so that such condensed water droplets E can be readily eliminated by a stream of the oxidizing gas flowing within the communicating grooves 33. In consequence, the blockage of the communicating grooves 33 due to the growth of the condensed water can be more effectively improved by virtue of the water repellent wall faces in combination with the above-described dwelling suppressive effect on the droplets E.

It has been found that the condensed water can be effectively kept in a drop-shaped state by applying water repellent finishing to the communicating groove wall faces W1 as a surface treatment such that the surface energy of the communicating groove wall faces W1 becomes 70 $\mu$N/mm or less.

The surface energy (70 $\mu$N/mm) of the communicating groove wall faces W1 was evaluated by conducting a wettability test on the communicating groove wall faces W1 in compliance with JISK6768. More specifically, several drops (diameter=0.1 mm) of a commercially-available, wettability-index standard reagent having a known surface energy were applied to the measurement target surface (i.e., the communicating groove wall faces W1) and the surface energy of the reagent when the drops cannot keep their spherical shape was regarded as the surface energy of the communicating groove wall faces W1.

Water repellent finishing treatments for the communicating groove wall faces W1 can be performed on already developed method and therefore a detailed explanation thereof is omitted herein.

Next, one example of the operation of the fuel cell stack 100 of this embodiment will be described.

The gas diffusion electrode 5 in contact with the anode separator plate 2 is exposed, through the upper openings of the plurality of fuel gas passage grooves, to the fuel gas flowing at a constant speed within the fuel gas passage grooves, while adequately and sufficiently preventing flooding caused by the condensed water.

The gas diffusion electrode 5 in contact with the cathode separator plate 3 is exposed, through the upper openings of the plurality of oxidizing gas passage grooves 35, to the oxidizing gas flowing at a constant speed within the oxidizing gas passage grooves 35, while adequately and sufficiently preventing flooding caused by the condensed water.

Therefore, the fuel gas diffuses uniformly into the entire surface of its associated gas diffusion electrode 5 while flowing in the fuel gas passage region 101 whereas the oxidizing gas diffuses uniformly into the entire surface of its associated gas diffusion electrode 5 while flowing in the oxidizing gas passage region 101. As a result, the power generation by the fuel cell stack 100 can be uniformly performed over the entire area of the gas diffusion electrodes 5.

As has heretofore been described, in the cathode separator plate 3 of this embodiment, the communicating grooves 33 for providing fluid communication between the adjacent portions of the oxidizing gas passage grooves 35 are provided on the surface (e.g., ribs 36) of the cathode separator plate 3 so as to be shallower than the oxidizing gas passage grooves 35, whereby the oxidizing gas can flow between the adjacent oxidizing gas passage grooves 35 by way of the communicating grooves 33 while the traveling of the droplets E of the condensed water between the adjacent oxidizing gas passage grooves 35 being inhibited. This leads to not only uniformization of the pressure and flow rate of the oxidizing gas flowing in the oxidizing gas passage grooves 35 but also adequate and secure suppression of flooding caused by the concentration of the condensed water within the oxidizing gas passage grooves 35.

Since the cathode separator plate 3 of this embodiment has the communicating grooves 33 which is easy to overcome blockage caused by the growth of the condensed water, the pressure and flow rate of the oxidizing gas can be adequately uniformized.

Further, as a side effect of the communicating grooves 33 designed to be shallower than the oxidizing gas passage grooves 35, the mechanical strength of the cathode separator plate 3 can be increased because the cathode separator plate 3 is thick in the area where the communicating grooves 33 are formed, compared to the conventional cathode separator plates provided with the communicating grooves 33 having the same depth as depth L1 of the oxidizing gas passage grooves 35.

MODIFICATIONS OF THE EMBODIMENT

Modifications of the configuration of the oxidizing gas passage region 102 of the cathode separator plate 3 shown in FIG. 2 will be described.

Modification 1

Figure 6:
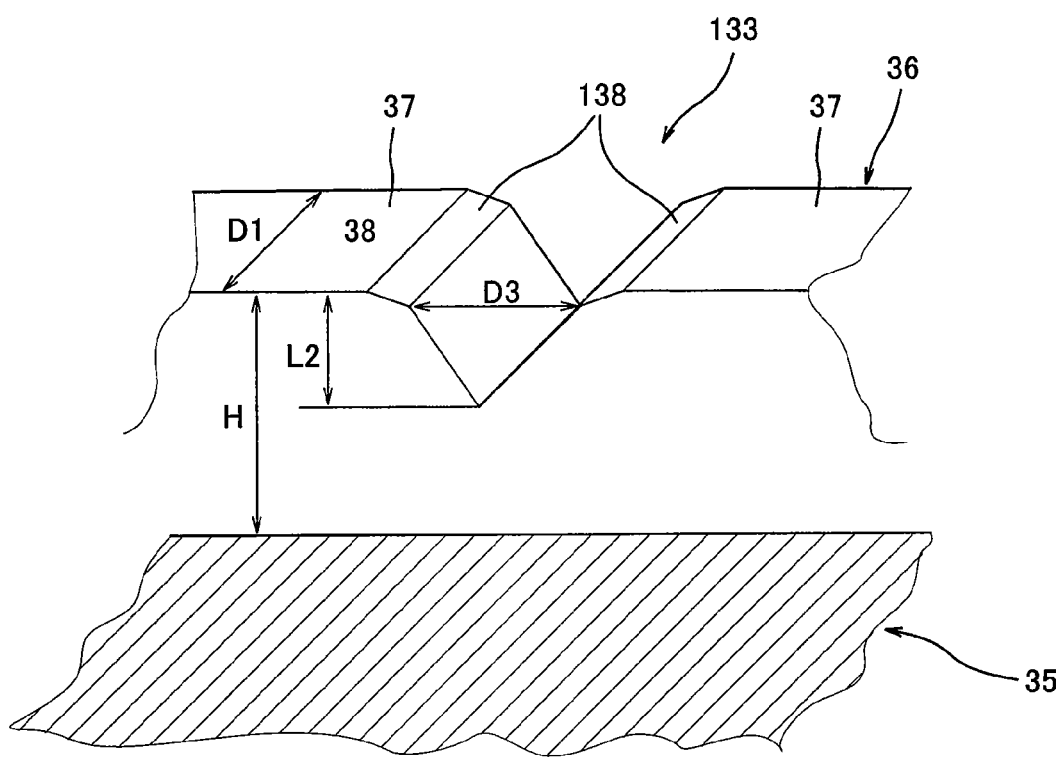
FIG. 6 is an enlarged perspective view that diagrammatically shows a communicating groove formed on ribs and an oxidizing gas passage groove in the region C of FIG. 5.

FIG. 5 is a diagram illustrating, as a structural example, a surface of a cathode separator according to Modification 1. FIG. 6 is an enlarged perspective view that diagrammatically shows a communicating groove formed on ribs and an oxidizing gas passage groove in the region C of FIG. 5.

In the cathode separator plate 103 of this modification, the arrangement and shape of the communicating grooves 33 of the embodiment shown in FIGS. 2 and 3 are modified as follows.

As illustrated in FIGS. 5 and 6, the first, second, third and fourth turn portions 32A, 32B, 32C, 32D of an oxidizing gas passage region 202 are provided with a plurality of communicating grooves 133 for providing fluid communication between at least the adjacent portions of the oxidizing gas passage grooves 35. Each communicating groove 133 is formed by partially cutting a rib 36 of the cathode separator plate 103 away widthwise of the oxidizing gas passage grooves 35 (i.e., in a width direction of the oxidizing gas passage groove group).

The oxidizing gas passage groove 35 located at one end of the oxidizing gas passage groove group as viewed in the width direction thereof through the oxidizing gas passage groove 35 located at the other end are communicated with each other in succession by means of the plurality of communicating grooves 33.

In this modification, the first, second, third and fourth turn portions 32A, 32B, 32C, 32D are formed as follows: In the inner one (hereinafter referred to as "inner rib 36") of the three ribs 36, two communicating grooves 133 are arranged with specified intervals. In the middle one (hereinafter referred to as "middle rib 36") of the ribs 36, four communicating grooves 133 are arranged at specified intervals. In the outer one (hereinafter referred to as "outer rib 36") of the ribs 36, six communicating grooves 133 are arranged at specified intervals. Thereby, a set of twelve communicating grooves 133 in total is provided in a region that is substantially triangular in plan view.

Four hypothetical lines G3, each of which represents an elongation axis common to two or three communicating grooves 133, are drawn in the width direction of the oxidizing gas passage groove 35 as shown in FIG. 5.

More specifically, the hypothetical line G3 in the first row extends along the communicating groove 133 formed in the second row of the outer rib 36 and the communicating groove 133 formed in the first row of the middle rib 36.

The hypothetical line G3 in the second row extends along the communicating groove 133 formed in the third row of the outer rib 36, the communicating groove 133 formed in the second row of the middle rib 36 and the communicating groove 133 formed in the first row of the inner rib 36.

The hypothetical line G3 in the third row extends along the communicating groove 133 formed in the fourth row of the outer rib 36, the communicating groove 133 formed in the third row of the middle rib 36 and the communicating groove 133 formed in the second row of the inner rib 36.

The hypothetical line G3 in the fourth row extends along the communicating groove 133 formed in the fifth row of the outer rib 36 and the communicating groove 133 formed in the fourth row of the middle rib 36.

The groove pattern of arrangement of the communicating grooves 133 and the oxidizing gas passage grooves 35 is a grid-like pattern in plan view. The communicating grooves 133 and the oxidizing gas passage grooves 35 are extending along a grid-like mesh made by the hypothetical lines G3 and three hypothetical lines G4 along the oxidizing gas passage grooves 35. The arrangement of the communicating grooves 133 and the oxidizing gas passage grooves 35 in a grid-like pattern (herein, an orthogonal-grid pattern) allows the oxidizing gas flowing to the oxidizing gas passage grooves 35 by way of the communicating grooves 133 to cross the streams of the oxidizing gas in the oxidizing gas passage grooves 35 (at right angles in this modification) so that mixing of the oxidizing gas between the oxidizing gas passage grooves 35 can be speeded up.

The arrangement in which the four hypothetical lines G3 indicating the elongation axes of the communicating grooves 133 are displaced from the diagonal dotted line M (see FIG. 2) is the same as that of the embodiment described earlier and therefore an explanation thereof is omitted herein.

As illustrated in FIG. 6, each of the communicating grooves 133 is a wedge-like groove having a V-shaped section and formed by notching the rib 36 from the top face 37 thereof so as to cut off a substantially triangular-prism-shaped rib portion having a depth L2 and a side D3. The depth L2 of the communicating groove 133 is smaller than the depth H of the oxidizing gas passage grooves. The edges of each communicating groove 133 in contact with the gas diffusion electrode 5 are chamfered, forming tapered portions 138 as shown in FIG. 6. This prevents the gas diffusion electrode 5 from coming into contact with the edges of the communicating groove 133 so that mechanical damage (e.g., breakage) to the gas diffusion electrode 5 can be avoided.

The forming process and surface treatment (water repellent finishing) for the communicating grooves 133 are the same as described earlier in the embodiment and therefore an explanation thereof is omitted.

As has heretofore been described, in the cathode separator plate 103 of this modification, the communicating grooves 133 for providing fluid communication between the adjacent portions of the oxidizing gas passage grooves 35 are formed on the surface (e.g., ribs 36) of the cathode separator plate 103 so as to be shallower than the adjacent oxidizing gas passage grooves 35, whereby the oxidizing gas can flow between the adjacent oxidizing gas passage grooves 35 by way of the communicating grooves 133 while the traveling of the droplets E of the condensed water between the adjacent oxidizing gas passage grooves 35 being inhibited.

This leads to not only uniformization of the pressure and flow rate of the oxidizing gas flowing between the oxidizing gas passage grooves 35 but also adequate and secure suppression of flooding caused by the concentration of the condensed water within the oxidizing gas passage grooves 35.

Since the cathode separator plate 103 of this embodiment has the communicating grooves 133 which is easy to overcome blockage caused by the growth of the condensed water, the pressure and flow rate of the oxidizing gas can be adequately uniformized.

Further, as a side effect of the communicating grooves 133 designed to be shallower than the oxidizing gas passage grooves 35, the mechanical strength of the cathode separator plate 103 can be increased because the cathode separator plate 103 is thick in the area where the communicating grooves 133 are formed, compared to the conventional cathode separator plates provided with the communicating grooves 133 that have the same depth as depth L2 of the oxidizing gas passage grooves 35.

Modification 2

FIG. 7 is a diagram illustrating, as a structural example, a surface of a cathode separator according to Modification 2.

In the cathode separator plate 203 of this modification, the configuration of the oxidizing gas passage grooves of Modification 1 shown in FIG. 5 is modified as follows.

Although a drawing and explanation are omitted herein, the cathode separator plate 203 of this modification may be formed by modifying the oxidizing gas passage grooves of the embodiment shown in FIG. 2.

In the cathode separator plate 203 shown in FIG. 7, the number of oxidizing gas passage grooves 135 provided in an oxidizing gas passage region 302 so as to be connected to the oxidizing gas outlet manifold hole 13A is less than the number of oxidizing gas passage grooves 135 provided in the oxidizing gas passage region 302 so as to be connected to the oxidizing gas inlet manifold hole 13B.

More specifically, the four oxidizing gas passage grooves 135 in a first L-shaped bent portion 131A of the oxidizing gas passage region 302 are respectively, independently connected to the oxidizing gas inlet manifold hole 13A located at the upper side and extend downward from the oxidizing gas inlet manifold hole 13A to a point at which they bend at substantially 90 degrees, taking the form of L. Then, the oxidizing gas passage grooves 35 extend from the second side toward the first side.

In a first turn portion 132A of the oxidizing gas passage region 302, the four oxidizing gas passage grooves 135 continue from the grooves 135 in the first L-shaped bent portion 131A and then make an approximately 180° turn, bending at a right angle twice so that they are formed into a substantially U-shape.

In a first linear portion 131B of the oxidizing gas passage region 302, the four oxidizing gas passage grooves 135 continue from the grooves 135 in the first turn portion 132A located on the first side and linearly extend toward the second side.

In a second turn portion 132B of the oxidizing gas passage region 302, the oxidizing gas passage grooves 135 continue from the grooves 135 in the first linear portion 131B and then make an approximately 180° turn, bending at a right angle twice so that they are formed into a substantially U-shape. Of the four oxidizing gas passage grooves 135, the outermost oxidizing gas passage groove 135 and the adjacent oxidizing gas passage groove 135 merge to form the single oxidizing gas passage groove 135 halfway through their turning.

In a second linear portion 131C of the oxidizing gas passage region 302, the three oxidizing gas passage grooves 135 continue from the grooves 135 in the second turn portion 132B located on the second side and linearly extend toward the first side.

In a third turn portion 132C of the oxidizing gas passage region 302, the three oxidizing gas passage grooves 135 continue from the grooves 135 in the second linear portion 131C and then make an approximately 180° turn, bending at a right angle twice so that they are formed into a substantially U-shape.

In a third linear portion 131D of the oxidizing gas passage region 302, the three oxidizing gas passage grooves 135 continue from the grooves 135 in the third turn portion 132C located on the first side and linearly extend toward the second side.

In a fourth turn portion 132D of the oxidizing gas passage region 302, the three oxidizing gas passage grooves 135 continue from the grooves 135 in the third linear portion 131D and then make an approximately 180° turn, bending at a right angle twice so that they are formed into a substantially U-shape. Of the three oxidizing gas passage grooves 135, the outermost oxidizing gas passage groove 135 and adjacent oxidizing gas passage groove 135 merge to form the single oxidizing gas passage groove 135 halfway through their turning.

In a fourth linear portion 131E of the oxidizing gas passage region 302, the two linear oxidizing gas passage grooves 135 continue from the grooves 135 in the fourth turn portion 132D located on the second side and linearly extend to the first side.

In a fifth turn portion 132E of the oxidizing gas passage region 302, the two oxidizing gas passage grooves 135 continue from the grooves 135 in the fourth linear portion 131E and then make an approximately 180° turn, bending at a right angle twice so that they are formed into a substantially U-shape.

In a fifth linear portion 131F of the oxidizing gas passage region 302, the two oxidizing gas passage grooves 135 continue from the grooves 35 in the fifth turn portion 132E located on the first side and linearly extend toward the second side.

In a sixth turn portion 132F of the oxidizing gas passage region 302, the two oxidizing gas passage grooves 135 continue from the grooves 135 in the fifth linear portion 131F and then make an approximately 180° turn, bending at a right angle twice so that they are formed into a substantially U-shape.

In a second L-shaped bent portion 131G of the oxidizing gas passage region 302, the two oxidizing gas passage grooves 135 continue from the grooves 135 in the sixth turn portion 132F located on the second side, extending to the first side. Then, they bend at approximately 90 degrees to extend downward, taking the form of L and are respectively independently connected to the oxidizing gas outlet manifold hole 13B.

It should be noted that the configuration of the cathode separator plate 203 of Modification 2 does not differ from that of the cathode separator plate 103 of Modification 1 except the above-described oxidizing gas passage grooves 135 and therefore an explanation of the features common to them is omitted herein.

In the cathode separator plate 203 of this modification, the number of oxidizing gas passage grooves 135 is determined, taking account of the consumption of the oxidizing gas flowing in the oxidizing gas passage grooves 135 for the power generation, such that the oxidizing gas flows in the L-shaped bent portions 131A, 131G, the linear portions 131B to 131F and the turn portions 132A to 132F at the same flow velocity appropriate for ejection of the droplets of condensed water.

Therefore, uniform feeding of the oxidizing gas into the surface of the gas diffusion electrode 5 is enabled and the ability of the oxidizing gas to expel the condensed water separated from the oxidizing gas can be ensured at the downstream side (e.g., the vicinity of the oxidizing gas outlet manifold hole 13B) where the flow volume of the oxidizing gas is small and therefore the condensed water tends to be easily trapped.

(Verification for Suppressive Effect on Flooding)

Figure 8:
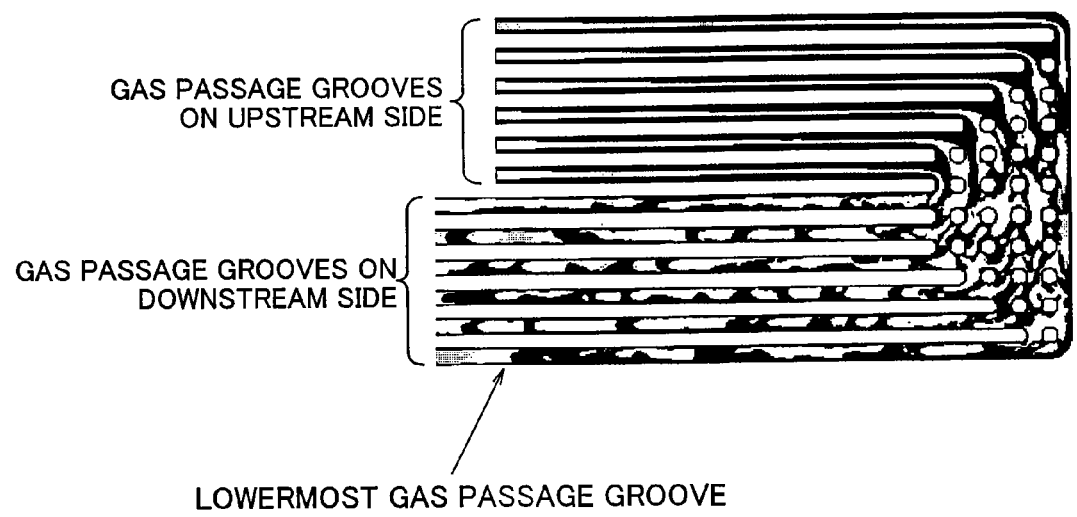
FIG. 8 is a diagram which diagrammatically shows, as an example, an analysis result and an analysis model which have been output to a computer.

As explained earlier with reference to the analysis result of FIG. 8, a simulation was run with an analysis model prepared in accordance with the gas passage groove design disclosed in FIG. 3 of Patent Document 2. And, the phenomenon that motion of a generous amount of condensed water in a circumferential direction of a turn portion owing to its inertia force caused blockage of a gas passage groove (e.g., the lowest gas passage groove) is simulated. In such a case, there is a high possibility that a voltage drop occurs in the fuel cell because of a shortage of reaction gas in the gas passage groove clogged with the condensed water.

In view of this, the inventors made, as prototypes, a fuel cell (hereinafter referred to as "comparative example prototype") that incorporated the separator plate of Patent Document 2 (FIG. 3) as a cathode separator plate and a fuel cell (hereinafter referred to as "embodiment prototype") that incorporated the separator plate of Modification 1 (FIG. 5) as a cathode separator plate. And, they put these prototypes into operation and carried out a comparison test on them to check the amount of voltage drop in a fuel cell in relation to the flow ratio of cathode gas in the fuel cell.

Whereas Patent Document 2 (FIG. 3) and Modification 1 employ the same number of gas passage grooves, the number of gas passage grooves in the prototypes are reduced in the turn portions taking account of the consumption of the gas flowing in the gas passage grooves for the power generation, so that the flow velocity of the reaction gas becomes adequate for the ejection of the condensed water droplets. The reason for this is as follows.

Setting of the number of gas passage grooves so as to obtain an optimum gas flow rate within the surface of the separator plate has such a merit that the difference in the amount of voltage drop between the comparative example prototype and the embodiment prototype can be obtained easily, the voltage drop being caused by blockage of a gas passage groove attributable to swirl of the condensed water in a turn portion of the separator plate.

If the gas flow rate in the gas passage grooves of the separator plate is inadequate, flooding becomes likely to occur in the downstream side of the gas passage grooves where the amount of reaction gas decreases. And, if such flooding becomes noticeable, the voltage drop caused by the flooding will be unignorable as a disturbance, which sometimes leads to a failure to obtain a significant difference between the comparative example prototype and the embodiment prototype.

As described later, the shape of the communicating grooves of the embodiment prototype differs from the shape (V-shape) of the communicating grooves 133 of Modification 1 in the light of consistency with the structure of the comparative example prototype.

The structures of the separator plate of the embodiment prototype and the separator plate of the comparative example prototype will be described.

As to the anode separator plate, the embodiment prototype and the comparative example prototype are similarly constructed. Therefore, the structures of their anode separator plates will be omitted from the following description.

The cathode separator plate of the embodiment prototype and the cathode separator plate of the comparative example prototype do not differ from each other except the configuration of the turn portions and their surrounding areas. Therefore, only one structural example of the turn portions and their surrounding areas in the cathode separator plate will be explained below.

Figure 9:
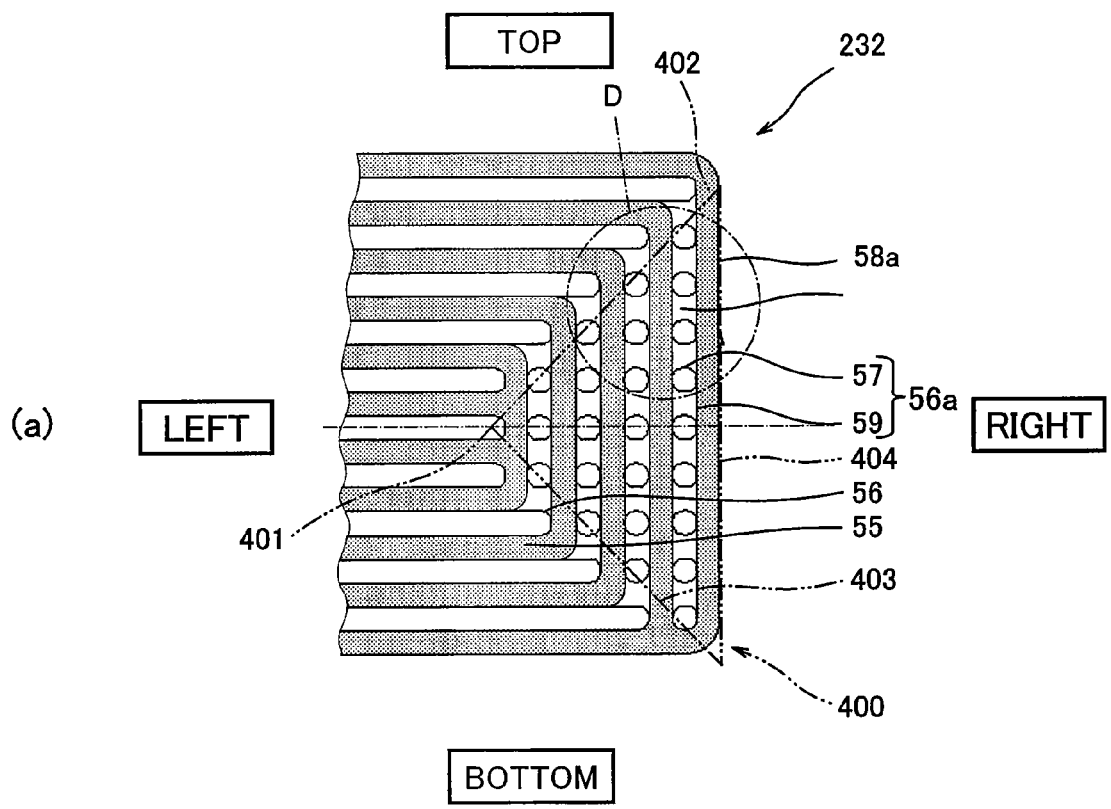
FIG. 9 is diagrams each diagrammatically showing a turn portion of a cathode separator plate and its surrounding area according to a prototype of the embodiment.
Figure 9:
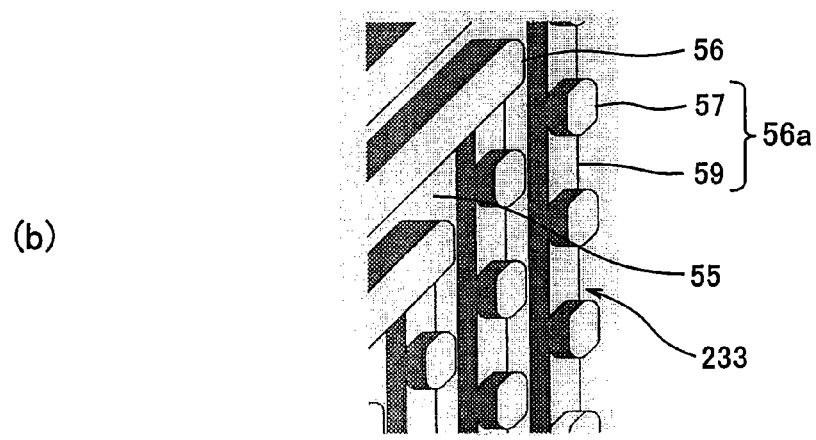

FIG. 9 is diagrams each diagrammatically showing a turn portion of the cathode separator plate and its surrounding area in the embodiment prototype. Specifically, FIG. 9(a) shows a plan view of a turn portion of the cathode separator plate in the embodiment prototype (i.e., a view of a turn portion when viewed in a thickness direction of the cathode separator plate), whereas FIG. 9(b) shows a perspective view of the region D of FIG. 9(a).

Figure 10:
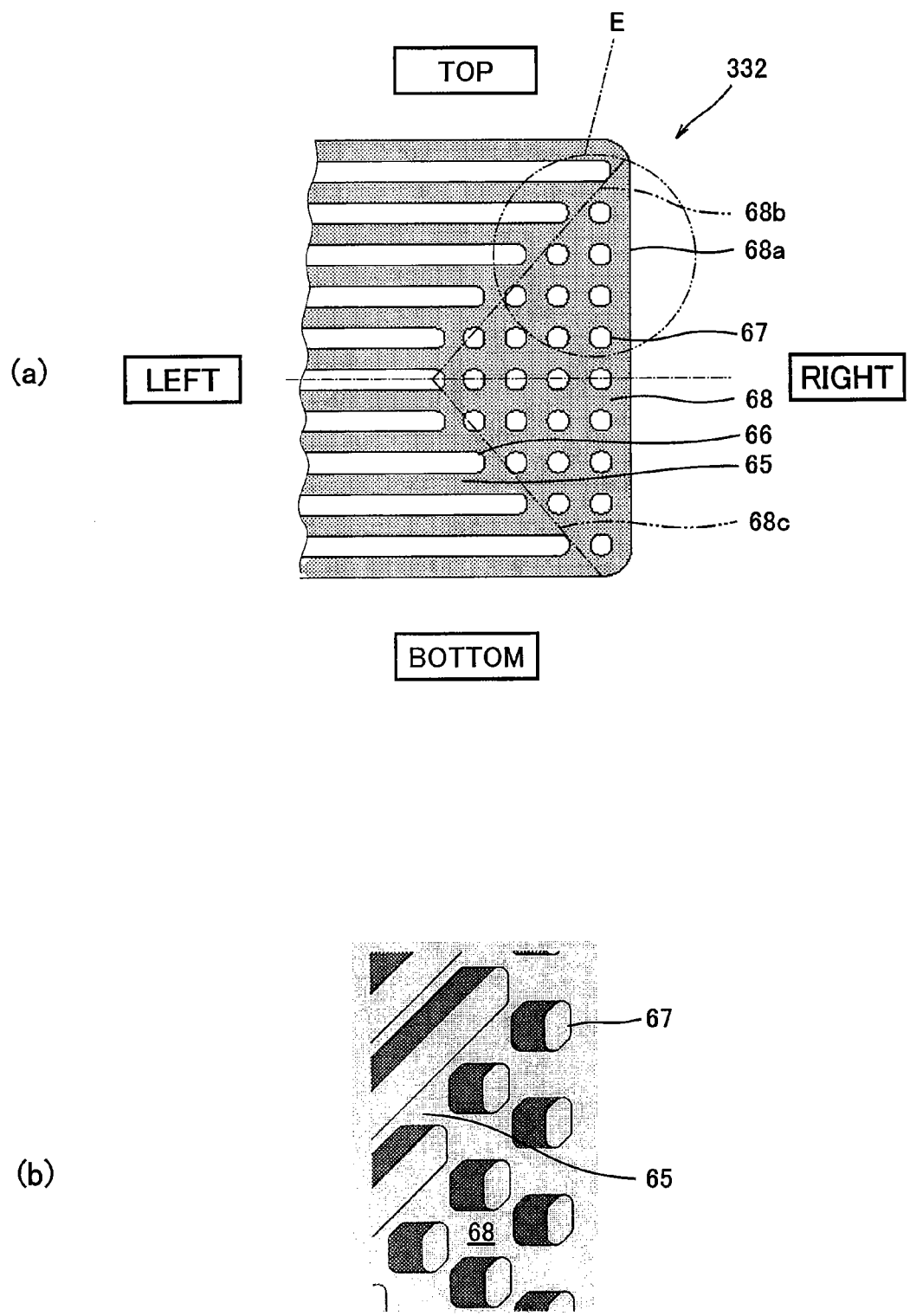
FIG. 10 is diagrams each diagrammatically showing a turn portion of a cathode separator plate and its surrounding area according to a prototype of a comparative example.

FIG. 10 is diagrams each diagrammatically showing a turn portion of the cathode separator plate and its surrounding area in the comparative example prototype. Specifically, FIG. 10(a) shows a plan view of a turn portion of the cathode separator plate in the comparative example prototype (i.e., a view of a turn portion when viewed in a thickness direction of the cathode separator plate), whereas FIG. 10(b) shows a perspective view of the region E of FIG. 10(a).

Referring to FIG. 9(a), a turn portion 232 has a bottom side 58a that extends in a vertical direction as an outer end of the turn portion 232. In the turn portion 232, laterally extending ribs 56 and vertically extending ribs 56a with communicating grooves are formed in a continuous fashion. Specifically, as illustrated in FIGS. 9(a), 9(b), the ribs 56a with communicating grooves are each comprised of a base portion 59 that vertically extends in the turn portion 232 so as to be connected to the ribs 56 and island-shaped (substantially cylindrical) projections 57 that extend upright on the top surface of the base portion 59. The space between every adjacent projection 57 functions as a communicating groove 233 for providing fluid communication between the adjacent portions of the gas passage grooves 55.

Herein, the number of gas passage grooves 55 located on the upstream side of the turn portion 232 is six, whereas the number of gas passage grooves 55 located on the downstream side of the turn portion 232 is five. In the vicinity of the downstream side of the turn portion 232, the outermost gas passage groove 55 and adjacent oxidizing gas passage groove 55 merge to form the single oxidizing gas passage groove 55.

The communicating grooves 233 are formed by partially cutting the vertically extending ribs such that the projections 57 left after the cutting have the same sectional shape as of the projections 67 of the comparative example test model described later.

As shown in FIG. 9(b), the height of the projections 57 (i.e., the depth of the communicating grooves 233) is approximately one-half of the height of the ribs 56 (i.e., the depth of the gas passage grooves 55).

The projections 57 of the ribs 56a with communicating grooves are arranged in an orthogonal grid pattern such that their centers are in register with one another with respect to the extending direction of the bottom side 58a (i.e., vertical direction) and a direction perpendicular to this extending direction (i.e., lateral direction (=the extending direction of the ribs 56)).

In the turn portion 232 shown in FIG. 9 as well as the turn portions described in the embodiments of the present specification, a hypothetical triangle 400 (that is, herein, a substantially isosceles right triangle) can be drawn as illustrated in FIG. 9(a). This hypothetical triangle 400 has the vertical straight line communicating both ends of the bottom side 58a as a first side 404 and the point, which is on the center line of the sixth rib 56 from the top (the rib that defines the innermost gas passage groove 55) and located in the vicinity of the leading end of the sixth rib 56, as an apex 401.

In the turn portions of FIG. 9 and the embodiments, the relationship in length between a second side 402 and a third side 403 of the triangle 400 and the relationship in length between these sides 402, 403 and the first side 404 are as follows. The length of the second side 402 is equal to the length of the third side 403 (i.e., the length of the second side 402=the length of the third side 403) and the length of the second and third sides 402, 403 is shorter than the first side 404 (i.e., the length of the second and third sides 402, 403<the length of the first side 404).

It however should be noted that the above lengthwise relation is merely one example of the separator plate of the invention and therefore the configuration of the separator plate is not necessarily limited to this.

According to one modification of the turn portion configuration of the separator plate, the turn portions of the separator plate may have a triangle configuration that has the relationship represented by "the length of the second side 402=the length of the third side 403=the length of the first side 404" (in this case, the triangle 400 is an equilateral triangle). In another alternative, the turn portions of the separator plate have a triangle configuration that has the relationship represented by "the length of the second side 402 (=the length of the third side 403)>the length of the first side 404" (in this case, the triangle 400 is an isosceles acute triangle having an apex angle of less than 60°).

In FIG. 10(a), a recess 68 (gas interfluent region), which is communicated with six gas passage grooves 65 (convex portions 65) on the upstream side and five gas passage grooves 65 on the downstream side, is defined in the form of a substantial triangle composed of a bottom side 68a that vertically extends as the outer end of a turn portion 332 and a pair of diagonal sides 68b, 68c that serve as the boundaries of the gas passage grooves 65 on the upstream and downstream sides, respectively.

As illustrated in FIGS. 10(a), 10(b), a plurality of island-shaped (substantially cylindrical) projections 67 extend upright on the bottom face of the recess 68. Like the projections 57 described earlier, the projections 67 are arranged in an orthogonal grid pattern such that their centers are in register with one another with respect to the extending direction of the bottom side 68a (i.e., vertical direction) and to a direction perpendicular to this extending direction (i.e., lateral direction (=the extending direction of the ribs 56)).

As stated earlier, the projections 57 of the embodiment prototype are formed into the same shape as of the projections 67 of the comparative example prototype. This is favorable because it ensures likeness between the turn portion configuration of the cathode separator plate of the embodiment prototype and the turn portion configuration of the cathode separator plate of the comparative example prototype, except that the communicating grooves 233 of the embodiment prototype are formed more shallowly than the gas passage grooves 55 (the depth of the communicating grooves 233 is about one-half of the depth of the gas passage grooves 55) so as to save the base portions 59 of the ribs 56a with communicating grooves.

Next, the result of a verification experiment conducted on the embodiment prototype and the comparative example prototype will be explained.

Figure 11:
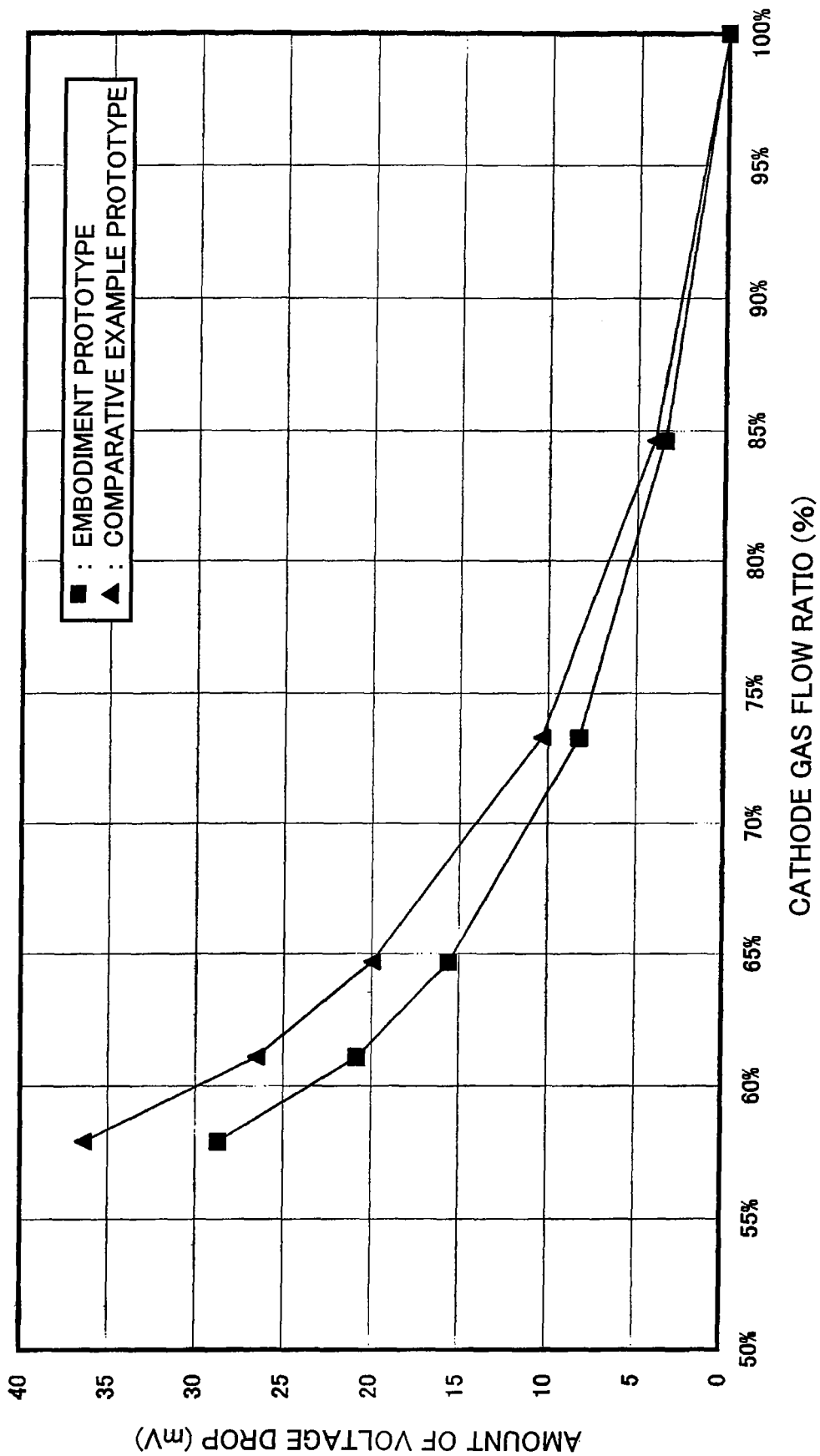
FIG. 11 is a graph showing the relationship between the prototype of the embodiment and the prototype of the comparative example, wherein a cathode gas flow ratio (%) is plotted on abscissa and the amount of voltage drop (mV) of the fuel cell on ordinate.

FIG. 11 is a graph showing the relationship between the embodiment prototype and the comparative example prototype, wherein a cathode gas flow ratio (%) is plotted on abscissa and the amount of voltage drop (mV) of the fuel cell on ordinate.

It should be noted that the amount of voltage drop as stated herein indicates the amount of voltage decreased from a reference value that is the output voltage (that falls within the range of, for example, from 600 mV to 800 mV) of the fuel cell in rated operation.

FIG. 11 shows a case where the cathode gas flow ratio decreases from 100% that is a condition for the rated operation of the fuel cell, so that a situation in which flooding is likely to occur in the cathode separator plate is intentionally made.

The operating conditions set for the embodiment prototype are the same as that of the comparative example prototype, but a detailed explanation thereof is omitted herein.

It is seen from FIG. 11 that the amount of voltage drop increases as the cathode gas flow ratio decreases in both the embodiment prototype and the comparative example prototype, but the rate of increase in the amount of voltage drop in the embodiment prototype is properly suppressed, compared to that of the comparative example prototype. For instance, when the cathode gas flow ratio is about 60%, the amount of voltage drop in the comparative example prototype is about 30 mV whereas the amount of voltage drop in the embodiment prototype is about 23 mV. As understood from this, the amount of voltage drop in the embodiment prototype is improved by about 7 mV over that of the comparative example prototype.

The difference in the amount of voltage drop between the embodiment prototype and the comparative example prototype is supposed to be attributable to the fact that the former is superior to the latter in terms of the flooding suppressive effect. Specifically, in the embodiment prototype, the communicating grooves 233 is formed more shallowly than the gas passage grooves 55 so that the motion of the condensed water in the circumferential direction of each turn portion 232 owing to the inertia force is inhibited by the base portion 59 of each rib 56a with communicating grooves. As a result, the concentration of the condensed water in a gas groove passage is prevented. This can be deemed to bring about the improvement in the amount of voltage drop caused by flooding.

The relevancy of the above analysis result and the flooding suppressive effect of the embodiment prototype improved over that of the comparative example prototype are confirmed by the result of the prototype test described above.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function maybe varied substantially without departing from the spirit of the invention.

INDUSTRIAL APPLICABILITY

The separator plate of the invention for use in a fuel cell provides an improved suppressive effect on the flooding of the fuel cell caused by excessive amounts of water and is applicable to, for example, PEFCs.

The invention claimed is:
1. A separator plate comprising:
a passage groove group including a plurality of gas passage grooves for flowing a reaction gas, the gas passage grooves being arranged in parallel on a main surface of the separator plate and extend in serpentine form when viewed as a whole; and a communicating groove configured to provide fluid communication between adjacent portions of the gas passage grooves, wherein said communicating groove is formed more shallowly than the gas passage grooves to inhibit the traveling of condensed water droplets between adjacent gas passage grooves, and surface energy of wall faces that define said communicating groove is smaller than surface energy of wall faces that define the gas passage grooves.

2. The separator plate according to claim 1, wherein the gas passage groove located at one widthwise end of said passage groove group through the gas passage groove located at the other widthwise end are communicated with each other in succession by said communicating groove.

3. The separator plate according to claim 1, wherein said communicating groove is formed so as to provide fluid communication between the portions of the gas passage grooves where the pressure of the reaction gas varies if the reaction gas is allowed to flow in said passage groove group on the presumption that the gas passage grooves are communicated with one another by said communicating groove.

4. The separator plate according to claim 1, wherein the surface energy of the wall faces that define said communicating groove is 70 μN/mm or less.

5. The separator plate according to claim 1, wherein a plurality of said communicating grooves are provided and a groove pattern constituted by the gas passage grooves and said communicating grooves has a grid-like configuration when viewed thicknesswise of said separator plate.

6. The separator plate according to claim 1, further comprising:

a gas inlet manifold hole connected to the plurality of gas passage grooves so as to guide the reaction gas into each of the gas passage grooves independently; and a gas outlet manifold hole connected to the plurality of gas passage grooves so as to discharge the reaction gas from each of the gas passage grooves independently, wherein the number of gas passage grooves connected to said gas outlet manifold hole is less than the number of gas passage grooves connected to said gas inlet manifold hole.

7. A fuel cell comprising:

an anode separator plate;

a cathode separator plate; and a membrane electrode assembly disposed between said anode separator plate and said cathode separator plate, wherein said separator plate according to claim 1 is incorporated as said anode separator plate and said cathode separator plate, and wherein the reaction gas supplied to said anode separator plate is a reducing gas, and the reaction gas supplied to said cathode separator plate is an oxidizing gas.

8. The separator plate according to claim 1, wherein said communicating groove is formed by partially cutting ribs which define the gas passage grooves.

* * * * *